(12) United States Patent
Tomita et al.

(10) Patent No.: US 9,689,592 B2
(45) Date of Patent: Jun. 27, 2017

(54) IN-VEHICLE ABSORPTION HEAT PUMP DEVICE

(75) Inventors: Akifumi Tomita, Chiryu (JP); Osamu Tsubouchi, Chiryu (JP); Haruyuki Tsujihara, Okazaki (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 676 days.

(21) Appl. No.: 14/131,062

(22) PCT Filed: Jun. 21, 2012

(86) PCT No.: PCT/JP2012/004027
§ 371 (c)(1),
(2), (4) Date: Jan. 6, 2014

(87) PCT Pub. No.: WO2013/008393
PCT Pub. Date: Jan. 17, 2013

(65) Prior Publication Data
US 2014/0130530 A1    May 15, 2014

(30) Foreign Application Priority Data

Jul. 12, 2011  (JP) .................................. 2011-154086
Jul. 12, 2011  (JP) .................................. 2011-154089

(51) Int. Cl.
*B60H 1/00*    (2006.01)
*F25B 41/04*   (2006.01)
(Continued)

(52) U.S. Cl.
CPC .......... *F25B 30/04* (2013.01); *B60H 1/00899* (2013.01); *B60H 1/3201* (2013.01);
(Continued)

(58) Field of Classification Search
CPC ... B60H 1/00899; B60H 1/3201; F25B 30/04; Y02B 30/52
(Continued)

(56) References Cited

U.S. PATENT DOCUMENTS 3,556,200 A * 1/1971 Leonard, Jr. ............ F25B 15/06
                                                165/62
3,590,593 A * 7/1971 Miner ..................... F25B 15/06
                                                62/118
(Continued)

FOREIGN PATENT DOCUMENTS

DE  10 2008 002 319 A1  12/2009
EP       2 216 611 A1    8/2010
(Continued)

OTHER PUBLICATIONS

Partial Supplementary European Search Report issued Jul. 8, 2015, by the European Patent Office, in corresponding European Patent Application No. 12810975. (5 pages).
(Continued)

*Primary Examiner* — Henry Crenshaw
(74) *Attorney, Agent, or Firm* — Buchanan Ingersoll & Rooney PC

(57) ABSTRACT

An in-vehicle absorption heat pump device comprises a regenerator; an in-vehicle heat source heating absorbent in the regenerator; a gas-liquid separator; a condenser condensing gas phase separated from the absorbent; an evaporator evaporating a condensate to form vapor; an absorber for bringing the relatively concentrated absorbent in liquid phase in contact with the gas phase to cause the absorbent to absorb the gas phase and be relatively diluted; an absorbent circulation source circulating the absorbent; a bypass passage connecting a liquid-phase storing portion of the gas-liquid separator and the regenerator while bypassing the absorber; and a bypass transfer source in the bypass passage
(Continued)

returning the absorbent in the gas-liquid separator to the regenerator. To dilute absorbent in the absorber, a diluent passage allows the condenser and the absorber to communicate and the condensate in the condenser to be supplied to the absorber through the diluent passage by a dilution element.

10 Claims, 7 Drawing Sheets

(51) Int. Cl.
| | |
|---|---|
| *F25B 1/00* | (2006.01) |
| *F25B 27/00* | (2006.01) |
| *F25B 30/04* | (2006.01) |
| *B60H 1/32* | (2006.01) |
| *F25B 15/02* | (2006.01) |

(52) U.S. Cl.
CPC ........ *F25B 15/02* (2013.01); *F25B 2315/001* (2013.01); *F25B 2700/04* (2013.01); *Y02B 30/52* (2013.01)

(58) Field of Classification Search
USPC ............... 62/101, 118, 238.3; 165/42, 62
See application file for complete search history.

(56) References Cited

U.S. PATENT DOCUMENTS

| | | | | |
|---|---|---|---|---|
| 3,661,200 | A * | 5/1972 | McNamara | B60H 1/3201 165/42 |
| 4,691,528 | A * | 9/1987 | Tongu | F25B 15/008 62/238.3 |
| 4,890,463 | A * | 1/1990 | Cantoni | B60H 1/3201 62/238.3 |
| 5,231,849 | A * | 8/1993 | Rosenblatt | B60H 1/3201 62/238.3 |
| 5,255,528 | A * | 10/1993 | Dao | F25B 15/008 62/101 |
| 5,347,830 | A * | 9/1994 | Yamada | B60H 1/3201 165/104.12 |
| 5,383,341 | A * | 1/1995 | Zur | B60H 1/00007 62/112 |
| 5,462,582 | A * | 10/1995 | Holm | B01D 53/1425 95/175 |
| 5,896,747 | A * | 4/1999 | Antohi | B60H 1/3201 62/101 |

FOREIGN PATENT DOCUMENTS

| | | |
|---|---|---|
| JP | 50-138538 A | 11/1975 |
| JP | 61-1062 U | 1/1986 |
| JP | 63-302267 A | 12/1988 |
| JP | 7-133966 A | 5/1995 |
| JP | 9-42800 A | 2/1997 |
| JP | 9-119742 A | 5/1997 |
| JP | 11-218365 A | 8/1999 |
| JP | 2011-33236 A | 2/2011 |

OTHER PUBLICATIONS

Partial Supplementary European Search Report issued Jul. 8, 2015, by the European Patent Office, in corresponding European Patent Application No. 12810975.8 (5 pages).

International Search Report (PCT/ISA/210) mailed on Sep. 18, 2012, by the Japanese Patent Office as the International Searching Authority for International Application No. PCT/JP2012/004027.

Written Opinion (PCT/ISA/237) mailed on Sep. 18, 2012, by the Japanese Patent Office as the International Searching Authority for International Application No. PCT/JP2012/004027.

\* cited by examiner

IN-VEHICLE ABSORPTION HEAT PUMP DEVICE

TECHNICAL FIELD

The present invention relates to an in-vehicle absorption heat pump device having a regenerator for heating an absorbent. The present invention also relates to an in-vehicle absorption heat pump device having an absorber for diluting a concentrated absorbent.

BACKGROUND ART

Japanese Unexamined Patent Publication No. H09-119742 discloses an engine exhaust heat recovery type absorption refrigerator. This refrigerator comprises a regenerator for heating an absorbent, a condenser for condensing gas phase separated from the absorbent to form a condensate, an evaporator for evaporating the condensate condensed in the condenser to form vapor, and an absorber for bringing the relatively concentrated absorbent in liquid phase in contact with the gas phase evaporated in the evaporator so as to cause the absorbent to absorb the gas phase and be relatively diluted. This refrigerator uses an engine coolant as a heat source of the regenerator.

Japanese Unexamined Patent Publication No. S63-302267 discloses an absorption refrigerator having a gas-liquid separator. This refrigerator comprises a regenerator for heating an absorbent, a condenser for condensing gas phase separated from the absorbent to form a condensate, an evaporator for evaporating the condensate condensed in the condenser to form vapor, and an absorber for bringing the relatively concentrated absorbent in liquid phase in contact with the gas phase evaporated in the evaporator so as to cause the absorbent to absorb the gas phase and be relatively diluted. This refrigerator discloses a technique to use engine exhaust heat or an engine coolant as a heat source of the regenerator and, when the amount of heat of the heat source is insufficient, to drive an electric heater disposed on an outlet port side of the regenerator as a heat source.

Japanese Unexamined Patent Publication No. 2011-033236 discloses a viscous substance dilution device applicable to an absorber of a heat pump device. This device discloses a device for causing an absorbent serving as a viscous substance to actively absorb water vapor and be diluted by scattering the water vapor by a rotor.

PTL 1: Japanese Unexamined Patent Publication No. H09-119742

PTL 2: Japanese Unexamined Patent Publication No. S63-302267

PTL 3: Japanese Unexamined Patent Publication No. 2011-033236

DISCLOSURE OF INVENTION

Technical Problems

Since the regenerators of the absorption refrigerators described in the abovementioned Japanese Unexamined Patent Publication Nos. H09-119742 and S63-302267 are heat exchangers, in order to increase heat exchange efficiency in heating the absorbent flowing through each of the regenerators, it is preferred to increase flow rate per unit time of the absorbent flowing through each of the regenerators. In the abovementioned absorption refrigerators, however, there are limits to temporarily increase the flow rate per unit time of the absorbent flowing through each of the regenerators. Therefore, the heat exchange efficiency in heating the absorbent in each of the regenerators is not always sufficiently high.

According to the techniques of Japanese Unexamined Patent Publication Nos. H09-119742, S63-302267, and 2011-033236, when an operation of each of the systems is stopped, there is a risk that the absorbent may crystallize and solidify due to a decrease in temperature of the absorbent. Such solidification of the absorbent may harm a next smooth operation of each of the systems.

The present invention has been made in view of the above circumstances, and it is an object of the present invention to provide an in-vehicle absorption heat pump device which is advantageous in controlling heat exchange efficiency of an absorbent flowing through a regenerator. It is another object of the present invention to provide an in-vehicle absorption heat pump device capable of suppressing an absorbent from solidifying and securing a next smooth operation of a system even when an operation of the system is stopped.

Solution to Problems (1) An in-vehicle absorption heat pump device according to a first aspect of the present invention comprises (i) a regenerator for heating an absorbent; (ii) an in-vehicle heat source for heating the absorbent in the regenerator; (iii) a gas-liquid separator for separating gas phase and liquid phase from the absorbent heated by the in-vehicle heat source in the regenerator so as to relatively increase concentration of the absorbent; (iv) a condenser for condensing the gas phase separated from the absorbent to form a condensate; (v) an evaporator for evaporating the condensate condensed in the condenser to form vapor; (vi) an absorber for bringing the absorbent in liquid phase relatively concentrated by the separation of the gas phase in the gas-liquid separator in contact with the gas phase evaporated in the evaporator so as to cause the absorbent to absorb the gas phase and be relatively diluted and allow the diluted absorbent to be supplied to the regenerator; (vii) an absorbent circulation source for circulating the absorbent in a circulation passage connecting the regenerator, the gas-liquid separator and the absorber; (viii) a bypass passage connecting a liquid-phase storing portion of the gas-liquid separator and the regenerator while bypassing the absorber; and (ix) a bypass transfer source provided in the bypass passage, transferring the absorbent in liquid phase stored in the gas-liquid separator and returning the absorbent stored in the gas-liquid separator to the regenerator while bypassing the absorber.

The absorbent circulation source circulates the absorbent in the circulation passage connecting the regenerator, the gas-liquid separator and the absorber. It is preferred that output power of the absorbent circulation source is controlled in accordance with a user load required to the heat pump device. The absorbent circulation source can be anything as long as it can transfer the absorbent, and can be exemplified by an actuator such as a pump. Structure or kind of the actuator is not particularly limited. The absorbent in the regenerator is heated by the in-vehicle heat source to have a gas-liquid mixed state. The absorbent in the gas-liquid mixed state flows from the regenerator to the gas-liquid separator. The gas-liquid separator separates the gas phase and the liquid phase of the absorbent and relatively increases concentration of the absorbent. Thus, the absorbent in liquid phase is concentrated. The absorbent in liquid phase thus relatively concentrated in the gas-liquid separator flows to the absorber. On the other hand, the gas phase separated from the absorbent in liquid phase in the gas-liquid separator flows from the gas-liquid separator to the condenser, and is condensed in the condenser to form a condensate in liquid phase while generating latent heat of condensation. The condensate condensed in the condenser flows from the condenser to the evaporator and is evaporated in the evaporator to form vapor in gas phase. The vapor flows from the evaporator to the absorber.

The concentrated absorbent in liquid phase flown to the absorber contacts the gas phase flown from the evaporator to the absorber. This contact causes the concentrated absorbent to absorb the gas phase and be relatively diluted in the absorber. The diluted absorbent in the absorber flows from the absorber to the regenerator, and is heated again by the in-vehicle heat source in the regenerator so as to have a gas-liquid mixed state, and then flows to the gas-liquid separator. The absorbent thus circulates in the circulation passage connecting the regenerator, the gas-liquid separator and the absorber.

By the way, the heat pump device according to the present aspect comprises a bypass passage connecting a liquid-phase storing portion of the gas-liquid separator and the regenerator while bypassing the absorber. Furthermore, this heat pump device further comprises a bypass transfer source for returning the absorbent stored in the gas-liquid separator to the regenerator while bypassing the absorber. The bypass transfer source can be anything as long as it can transfer the absorbent in the gas-liquid separator to the regenerator without transferring the absorbent to the absorber, and can be exemplified by an actuator such as a pump. Structure or kind of the actuator is not particularly limited. Therefore, when heat exchange efficiency of the absorbent flowing through the regenerator is desired to be increased, while the absorbent circulation source is driven to circulate the absorbent in the circulation passage, the bypass transfer source which has been stopped is driven or increased in a driving amount per unit time. As a result, the absorbent in liquid phase stored in the gas-liquid separator can be directly returned to the regenerator while bypassing the absorber, that is to say, without being transferred via the absorber. Therefore, flow rate per unit time of the absorbent flowing through the regenerator increases. The absorbent having a thus increased flow rate per unit time can be heated by the in-vehicle heat source in the regenerator. As a result, the heat exchange efficiency of the absorbent flowing through the regenerator is increased.

In contrast, when the heat exchange efficiency of the absorbent flowing through the regenerator is desired to be decreased, while the absorbent circulation source is driven to circulate the absorbent in the circulation passage, the operation of the bypass transfer source is stopped or a driving amount per unit time of the bypass transfer source is decreased. As a result, flow rate per unit time of the absorbent to be transferred from the gas-liquid separator to the regenerator while bypassing the absorber decreases. Accordingly, the flow rate per unit time of the absorbent flowing through the regenerator decreases when compared to when the driving amount of the bypass transfer source is great. The absorbent having a thus decreased flow rate is heated by the in-vehicle heat source in the regenerator. As a result, the heat exchange efficiency of the absorbent flowing through the regenerator is decreased.

As mentioned above, according to the present aspect, upon driving the bypass transfer source, the flow rate per unit time of the absorbent flowing through the regenerator can be increased or decreased, and accordingly heat exchange efficiency in heating the absorbent flowing through the regenerator can be controlled. Accordingly the flow rate per unit time of the absorbent to be supplied from the regenerator to the gas-liquid separator can be controlled, so this contributes to concentration control of the absorbent.

(2) An in-vehicle absorption heat pump device according to a second aspect of the present invention is the in-vehicle absorption heat pump device of the above aspect, comprising a control unit for controlling an amount of the absorbent to be transferred by the bypass transfer source in accordance with at least one of a request load to output power of the in-vehicle absorption heat pump device, and an amount of radiated heat per unit time of the in-vehicle heat source. According to the present aspect, the control unit controls the amount of the absorbent to be transferred by the bypass transfer source in accordance with at least one of a request load to output power of the in-vehicle absorption heat pump device and an amount of radiated heat per unit time of the in-vehicle heat source, so as to control the flow rate per unit time of the absorbent flowing through the regenerator.

The in-vehicle absorption heat pump device comprises a condenser, which generates latent heat of condensation, and an evaporator, which generates latent heat of evaporation. The latent heat of condensation can be used in a heating system such as an air heater. The latent heat of evaporation can be used in a cooling system such as an air cooler. Therefore, examples of the request load to the in-vehicle absorption heat pump include a request load to a heating system such as a heating load, and a request load to a cooling system such as a cooling load. The in-vehicle heat source is at least one of an exhaust pipe for flowing exhaust gas from an in-vehicle engine, a coolant passage for flowing an engine coolant, an in-vehicle motor, an in-vehicle inverter for controlling the in-vehicle motor, and an in-vehicle battery for storing electric energy.

(3) According to an in-vehicle absorption heat pump device according to a third aspect of the present invention, in the above aspects, when heat exchange efficiency in the regenerator is desired to be increased, the absorbent in the gas-liquid separator is directly returned from the gas-liquid separator to the regenerator through the bypass passage without circulated from the gas-liquid separator to the absorber through the circulation passage. Therefore, the flow rate per unit time of the absorbent flowing through the regenerator increases. The absorbent having a thus increased flow rate per unit time can be heated by exchanging heat with the in-vehicle heat source in the regenerator. As a result, heat exchange efficiency in heating the absorbent flowing through the regenerator, which serves as a heat exchanger, can be increased and accordingly the flow rate of the absorbent to be transferred from the regenerator to the gas-liquid separator can be increased and concentration of the absorbent in the gas-liquid separator can be controlled.

(4) According to an in-vehicle absorption heat pump device according to a fourth aspect of the present invention, in the above aspects, when heat exchange efficiency in the regenerator is desired to be decreased, while the absorbent is circulated in the circulation passage from the gas-liquid separator through the absorber to the regenerator by the absorbent circulation source, the bypass transfer source for bypassing the absorbent from the gas-liquid separator to the regenerator is stopped or decreased in a driving amount. Therefore, the flow rate per unit time of the absorbent flowing through the regenerator decreases when compared to when the number of revolutions per unit time of the bypass transfer source is large. Since the absorbent having a thus decreased flow rate per unit time is heated by heat exchange in the regenerator, heat exchange efficiency in the regenerator, which serves as a heat exchanger, can be decreased. Accordingly, the flow rate of the absorbent to be transferred from the regenerator to the gas-liquid separator can be decreased and concentration of the absorbent in the gas-liquid separator can be controlled.

(5) An in-vehicle absorption heat pump device according to a fifth aspect of the present invention comprises (i) a regenerator for heating an absorbent capable of progressively solidifying; (ii) an in-vehicle heat source for heating the absorbent in the regenerator; (iii) a gas-liquid separator for separating gas phase and liquid phase from the absorbent heated by the in-vehicle heat source in the regenerator so as to relatively increase concentration of the absorbent; (iv) a condenser for condensing the gas phase separated from the absorbent to form a condensate in liquid phase; (v) an evaporator for evaporating the condensate condensed in the condenser to form vapor in gas phase; (vi) an absorber for bringing the absorbent in liquid phase relatively concentrated by the separation of the gas phase in the gas-liquid separator in contact with a diluent based on the vapor in gas phase evaporated in the evaporator so as to cause the absorbent to absorb the diluent and be relatively diluted and allow the diluted absorbent to be supplied to the regenerator; (vii) an absorbent circulation source for circulating the absorbent in a circulation passage connecting the regenerator, the gas-liquid separator and the absorber; (viii) a diluent passage allowing the condenser and the absorber to communicate with each other; and (ix) a dilution element provided in the diluent passage and, when there is a risk that at least part of the absorbent may solidify, performing dilution treatment of causing the condensate in liquid phase in the condenser to be supplied to the absorber through the diluent passage and diluting the absorbent in the absorber with the condensate.

According to the present aspect, the absorbent circulation source circulates the absorbent in the circulation passage connecting the regenerator, the gas-liquid separator and the absorber. The absorbent circulation source can be anything as long as it can transfer the absorbent, and can be exemplified by an actuator such as a pump. Structure or kind of the actuator is not particularly limited. The absorbent in the regenerator is heated by the in-vehicle heat source to have a gas-liquid mixed state. It is preferred that the in-vehicle heat source is at least one of an exhaust pipe for flowing exhaust gas from an in-vehicle engine, a coolant passage for flowing an engine coolant, an in-vehicle motor, an in-vehicle inverter for controlling the in-vehicle motor, and an in-vehicle battery for storing electric energy. Radiated heat from such an in-vehicle heat source can be effectively used to heat the absorbent in the regenerator into a gas-liquid mixed state.

The absorbent in the gas-liquid mixed state flows from the regenerator to the gas-liquid separator. The gas-liquid separator separates the gas phase and the liquid phase of the absorbent and relatively increases concentration of the absorbent. Thus, the absorbent in liquid phase is relatively concentrated. The absorbent in liquid phase relatively concentrated flows to the absorber. On the other hand, the vapor in gas phase separated from the absorbent in liquid phase in the gas-liquid separator flows from the gas-liquid separator to the condenser, and is condensed in the condenser to form a condensate in liquid phase while generating latent heat of condensation. The condensate condensed in the condenser flows from the condenser to the evaporator and is evaporated in the evaporator to form vapor in gas phase. A diluent based on the vapor flows to the absorber. The diluent can be vapor in gas phase, or, in some cases, liquid phase formed by devolatilization of the vapor in gas phase.

Then the concentrated absorbent in liquid phase flown to the absorber and the diluent based on the vapor flown from the evaporator to the absorber contact each other in the absorber. Thus, the concentrated absorbent is made to absorb the diluent and be relatively diluted in the absorber. The diluted absorbent flows from the absorber to the regenerator, is heated again by the in-vehicle heat source in the regenerator so as to have a gas-liquid mixed state. The absorbent in the gas-liquid mixed state flows to the gas-liquid separator and is separated into the gas phase and the liquid phase. As long as the absorption heat pump device is driven, the absorbent circulates in the circulation passage connecting the regenerator, the gas-liquid separator and the absorber, as mentioned above.

By the way, when there is a risk that at least part of the absorbent may solidify, the solidification may induce clogging of the passages. Therefore, according to the present aspect, the heat pump device comprises a diluent passage allowing the condenser and the absorber to communicate with each other. The heat pump device further comprises a dilution element for performing dilution treatment of causing the condensate in liquid phase in the condenser to be supplied to the absorber through the diluent passage and diluting the absorbent in the absorber. In this way, when there is a risk that at least part of the absorbent may solidify, the condensate (e.g., condensate water) in liquid phase in the condenser is supplied to the absorber through the diluent passage, thereby diluting the absorbent. Thus the solidification of the absorbent is suppressed, so clogging of the passages or the like is prevented beforehand. Since the condensate is a component originally contained in the absorbent, the condensate does not harm the absorbent.

Examples of "when there is a risk that at least part of the absorbent may solidify" include when a start switch of a vehicle driving source is off, when an operation switch of the heat pump device is off, when an atmosphere in which the heat pump device is mounted has an excessively low temperature, when outside air temperature is excessively low, and when an air conditioning load switch is off in a case of the heat pump device is used for an air conditioner. In these cases, since temperature of the absorbent gradually decreases, there is a risk that crystallization of the absorbent may proceed and at least part of the absorbent may solidify. It should be noted that the fifth aspect of the present invention can be combined with the first aspect of the present invention.

(6) According to an in-vehicle absorption heat pump device according to a sixth aspect of the present invention, in the above aspect, the dilution element is a first on-off valve for allowing, upon being opened, the condensate in liquid phase in the condenser to be supplied to the absorber based on a pressure difference between the condenser and the absorber, or a pump for supplying the condensate in liquid phase in the condenser to the absorber. If the first on-off valve is opened, the condensate (e.g., condensate water) in liquid phase in the condenser is supplied to the absorber based on a pressure difference between the condenser and the absorber so as to dilute the concentrated absorbent. Moreover, if the pump is driven, the condensate in liquid phase in the condenser is supplied to the absorber so as to dilute the concentrated absorbent.

(7) According to an in-vehicle absorption heat pump device according to a seventh aspect of the present invention, in the above aspects, in the dilution treatment, the absorbent diluted in the absorber is circulated in the circulation passage by driving the absorbent circulation source. The absorbent diluted in the absorber circulates in the circulation passage by driving the absorbent circulation source. Owing to this, the entire absorbent in the circulation passage is diluted and decreased in concentration. This makes it difficult for the absorbent to solidify.

(8) According to an in-vehicle absorption heat pump device according to an eighth aspect of the present invention, in the above aspects, a condenser liquid level sensor for detecting a liquid level of the condensate in liquid phase in the condenser is provided in the condenser, and when the liquid level of the condensate in the condenser detected by the condenser liquid level sensor is in or above a first height range, the dilution element is driven to supply the condensate in the condenser to the absorber, and when the liquid level of the condensate in the condenser detected by the condenser liquid level sensor is below the first height range, transfer of the condensate to the absorber based on the dilution element is stopped or slowed down.

When the liquid level of the condensate in the condenser detected by the condenser liquid level sensor is in or above the first height range, the condenser stores a large volume of the condensate. If the dilution element is driven in this situation, the condensate in the condenser is supplied to the absorber. The absorbent in the absorber is diluted and decreased in concentration. In contrast, when the liquid level of the condensate in the condenser detected by the condenser liquid level sensor is below the first height range, since flow rate of the condensate in the condenser is low, there is a risk that liquid sealing properties may decrease in the condenser. Therefore, when the liquid level of the condensate in the condenser is below the first height range, transfer of the condensate to the absorber based on the dilution element is stopped or slowed down. This suppresses an excessive decrease in the liquid level of the condensate water in the condenser, and liquid sealing properties of the condenser is maintained. The first height range can be arbitrarily set in accordance with circumstances of the heat pump device, and in short, corresponds to a desired minimum volume of the condensate to be stored in the condenser.

(9) According to an in-vehicle absorption heat pump device according to a ninth aspect of the present invention, in the above aspects, a second on-off valve for allowing, upon being opened, the condensate in the condenser to be supplied to the evaporator is provided between the condenser and the evaporator; an evaporator liquid level sensor for detecting a liquid level of the condensate in liquid phase to be evaporated in the evaporator is provided in the evaporator; and when the liquid level of the condensate in the evaporator detected by the evaporator liquid level sensor is in or above a second height range, the volume of the condensate stored in the evaporator is sufficient and the second on-off valve is closed so as to prevent the condensate in the condenser from excessively flowing to the evaporator. Hence, the liquid volume of the condensate in the condenser is well maintained and liquid sealing properties of the condenser is maintained. When the liquid level of the condensate in the evaporator detected by the evaporator liquid level sensor is below the second height range, the second on-off valve is opened. Therefore, a necessary liquid level of the condensate in the evaporator is maintained, and evaporation in the evaporator is well maintained. The second height range can be arbitrarily set in accordance with circumstances of the heat pump device, and in short, corresponds to a necessary volume of the condensate to be stored in order to perform evaporation in the evaporator.

(10) An in-vehicle absorption heat pump device according to a tenth aspect of the present invention is the heat pump device according to the above aspects, comprising: a first supply passage allowing a liquid phase outlet port of the gas-liquid separator and an inlet port of the absorber to communicate with each other, and the absorbent in liquid phase in the gas-liquid separator to be supplied to the absorber; a second supply passage allowing an outlet port of the absorber and an inlet port of the regenerator to communicate with each other and the absorbent in the absorber to be supplied to the regenerator; and a heat exchanger provided heat-exchangeably in the first supply passage and the second supply passage, and cooling the absorbent flowing in the first supply passage toward the absorber and heating the absorbent flowing in the second supply passage toward the regenerator. According to the present aspect, the first supply passage allows the liquid phase outlet port of the gas-liquid separator and the inlet port of the absorber to communicate with each other, and the absorbent in liquid phase in the gas-liquid separator to be supplied to the absorber. The second supply passage allows the outlet port of the absorber and the inlet port of the regenerator to communicate with each other, and the absorbent in the absorber to be supplied to the regenerator. The heat exchanger cools the absorbent having a relatively high temperature flowing in the first supply passage from the gas-liquid separator toward the absorber by heat exchange before the absorbent is supplied to the absorber. Thus the relatively high temperature absorbent discharged from the gas-liquid separator can be cooled by the heat exchanger before supplied to the absorber, so this is advantageous in increasing absorption efficiency in the absorber. On the other hand, the heat exchanger heats the absorbent having a relatively low temperature flowing in the second supply passage from the absorber toward the regenerator by heat exchange before the absorbent is supplied to the regenerator. Moreover, the relatively low temperature absorbent discharged from the absorber can be heated beforehand by the heat exchanger before supplied to the regenerator, so this is advantageous in heating in the regenerator.

(11) An in-vehicle absorption heat pump device according to an eleventh aspect of the present invention is the heat pump device according to the above aspects wherein the in-vehicle absorption pump device comprises an intermediate communication passage allowing a side of the liquid phase outlet port of the gas-liquid separator and a side of the inlet port of the absorber to communicate with each other so as to bypass the heat exchanger, a third on-off valve capable of opening and closing the intermediate communication passage and closed in an ordinary mode, and a separator liquid level sensor for detecting a liquid level of the absorbent in the gas-liquid separator, and when the liquid level of the absorbent in the gas-liquid separator detected by the separator liquid level sensor is in or above a third height range, the third on-off valve is opened based on a signal of the separator liquid level sensor so that the absorbent in the gas-liquid separator is supplied to the absorber while bypassing the heat exchanger.

According to the present aspect, the heat pump device comprises an intermediate communication passage allowing a side of the liquid phase outlet port of the gas-liquid separator and a side of the inlet port of the absorber to communicate with each other so as to bypass the heat exchanger. A third on-off valve capable of opening and closing the intermediate communication passage and closed in an ordinary mode is an on-off valve and is provided in the intermediate communication passage. The heat pump device comprises a separator liquid level sensor for detecting a liquid level of the absorbent in the gas-liquid separator. The separator liquid level sensor is a liquid level sensor. The third height range can be arbitrarily set in accordance with circumstances of the heat pump device, and in short, is set in order to prevent the absorbent in the gas-liquid separator from flowing to the condenser. If the absorbent in or above the third height range is stored, there is a high risk that the absorbent in the gas-liquid separator may overflow to the condenser.

By the way, since the heat exchanger has a passage group comprising a number of passages in order to enhance heat exchange ability, there is a risk that passage diameters may become small due to effects of dust contained in the absorbent, solidification of the absorbent and so on. Since the heat exchanger has a passage group comprising a number of passages in order to enhance heat exchange ability, even in the operation of the heat pump device, there is a risk that passage diameters may become small due to effects of solidification of the absorbent and so on. In this case, there is a risk that the absorbent supplied to the gas-liquid separator may be restricted from flowing to the heat exchanger. In this case, the absorbent supplied to the gas-liquid separator may overflow in the gas-liquid separator. There is a risk that the overflown absorbent in liquid phase may flow from the gas-liquid separator to the condenser. Since the condenser is to condense the gas phase to generate a condensate, it is not preferred that the absorbent in liquid phase flows into the condenser. Since the condenser is to condense the gas phase to generate a condensate, it is not preferred that the absorbent containing a chemical substance flows into the condenser.

Therefore, when the liquid level of the absorbent detected by the separator liquid level sensor in the gas-liquid separator is in or above the third height range, the third on-off valve is opened based on a signal of the separator liquid level sensor so that the absorbent in the gas-liquid separator is supplied to the absorber while bypassing the heat exchanger. This suppresses the absorbent in the gas-liquid separator from overflowing. Hence, a problem that the overflown absorbent flows from the gas-liquid separator to the condenser can be suppressed.

(12) According to an in-vehicle absorption heat pump device according to a twelfth aspect of the present invention, in the above aspects, the first supply passage has a U-character tube shape, and comprises a downward approach passage extending from the gas-liquid separator to the heat exchanger below and an upward return passage extending from the heat exchanger to the absorber above. The approach passage transfers the absorbent basically downward. The return passage transfers the absorbent basically upward. In this respect, when a liquid level of the absorbent in the gas-liquid separator is higher than a liquid level of the absorbent in the absorber, basically the absorbent can flow from the gas-liquid separator to the absorber through the first supply passage in accordance with a pressure difference between the gas-liquid separator and the absorber.

(13) According to an in-vehicle absorption heat pump device according to a thirteenth aspect of the present invention, in the above aspects, the heat exchanger cools the absorbent having a relatively high temperature flowing in the first supply passage by heat exchange, and heats the absorbent having a relatively low temperature flowing in the second supply passage by heat exchange. In this case, the heat exchanger cools the absorbent having a relatively high temperature flowing in the first supply passage from the gas-liquid separator toward the absorber by heat exchange before the absorbent is supplied to the absorber. On the other hand, the heat exchanger heats the absorbent having a relatively low temperature flowing in the second supply passage from the absorber toward the regenerator by heat exchange before the absorbent is supplied to the regenerator. Thus the relatively high temperature absorbent discharged from the gas-liquid separator can be cooled by the heat exchanger before supplied to the absorber. Hence, absorption efficiency of the absorbent in absorbing vapor in the absorber can be increased. On the other hand, the relatively low temperature absorbent discharged from the absorber can be preheated by the heat exchanger before supplied to the regenerator, and this preheating can supplement heating of the absorbent in the regenerator. Hence this is advantages in heating the absorbent into a boiling state, i.e., a gas-liquid mixed state in the regenerator.

(14) According to an in-vehicle absorption heat pump device according to a fourteenth aspect of the present invention, in the above aspects, the heat exchanger cools the absorbent having a relatively high temperature flowing in the first supply passage from the gas-liquid separator toward the absorber by heat exchange before the absorbent is supplied to the absorber, and heats the absorbent having a relatively low temperature flowing in the second supply passage from the absorber toward the regenerator by heat exchange before the absorbent is supplied to the regenerator. Thus, the relatively high temperature absorbent discharged from the gas-liquid separator can be cooled by the heat exchanger before supplied to the absorber. Hence absorption efficiency of the absorbent in absorbing vapor in the absorber can be increased. On the other hand, the relatively low temperature absorbent discharged from the absorber can be preheated by the heat exchanger before supplied to the regenerator, and this preheating can supplement heating of the absorbent in the regenerator. Hence this is advantageous in heating the absorbent into a boiling state, i.e., a gas-liquid mixed state in the regenerator.

(15) According to an in-vehicle absorption heat pump device according to a fifteenth aspect of the present invention, in the above aspects, the in-vehicle heat source is at least one of an exhaust pipe for flowing exhaust gas exhausted from an in-vehicle engine, a coolant passage for flowing an engine coolant, an in-vehicle motor, an in-vehicle inverter for controlling the in-vehicle motor, and an in-vehicle battery for storing electric energy. Radiated heat from these can be effectively used to heat the absorbent in the regenerator into a gas-liquid mixed state.

(16) According to an in-vehicle absorption heat pump device according to a sixteenth aspect of the present invention, in the above aspects, the gas-liquid separator is provided in an engine room and the regenerator is provided in vehicle external space below a partition wall of the engine room. Components of an exhaust system for engine exhaust gas are often provided in external space below a partition wall partitioning an engine room. Therefore, this is suitable to a case in which the in-vehicle heat source for heating the regenerator is an exhaust system component such as a muffler which uses exhaust heat of engine exhaust gas.

Advantageous Effects of Invention

As mentioned above, according to the in-vehicle absorption heat pump device according to the present invention, upon driving the bypass transfer source, the flow rate per unit time of the absorbent flowing through the regenerator can be increased or decreased, and accordingly heat exchange efficiency in exchanging heat of the absorbent flowing through the regenerator can be controlled. Moreover, since the absorbent in the absorber is diluted upon a stop to a request for a heat pump function, the absorbent is suppressed from excessively solidifying. Hence performance of the heat pump device can be well maintained for a long time and a next smooth operation of the heat pump device can be secured.

BEST MODES FOR CARRYING OUT THE INVENTION

Hereinafter, the present invention will be described based on respective examples embodying the present invention with reference to the drawings.

Example 1

Figure 1:
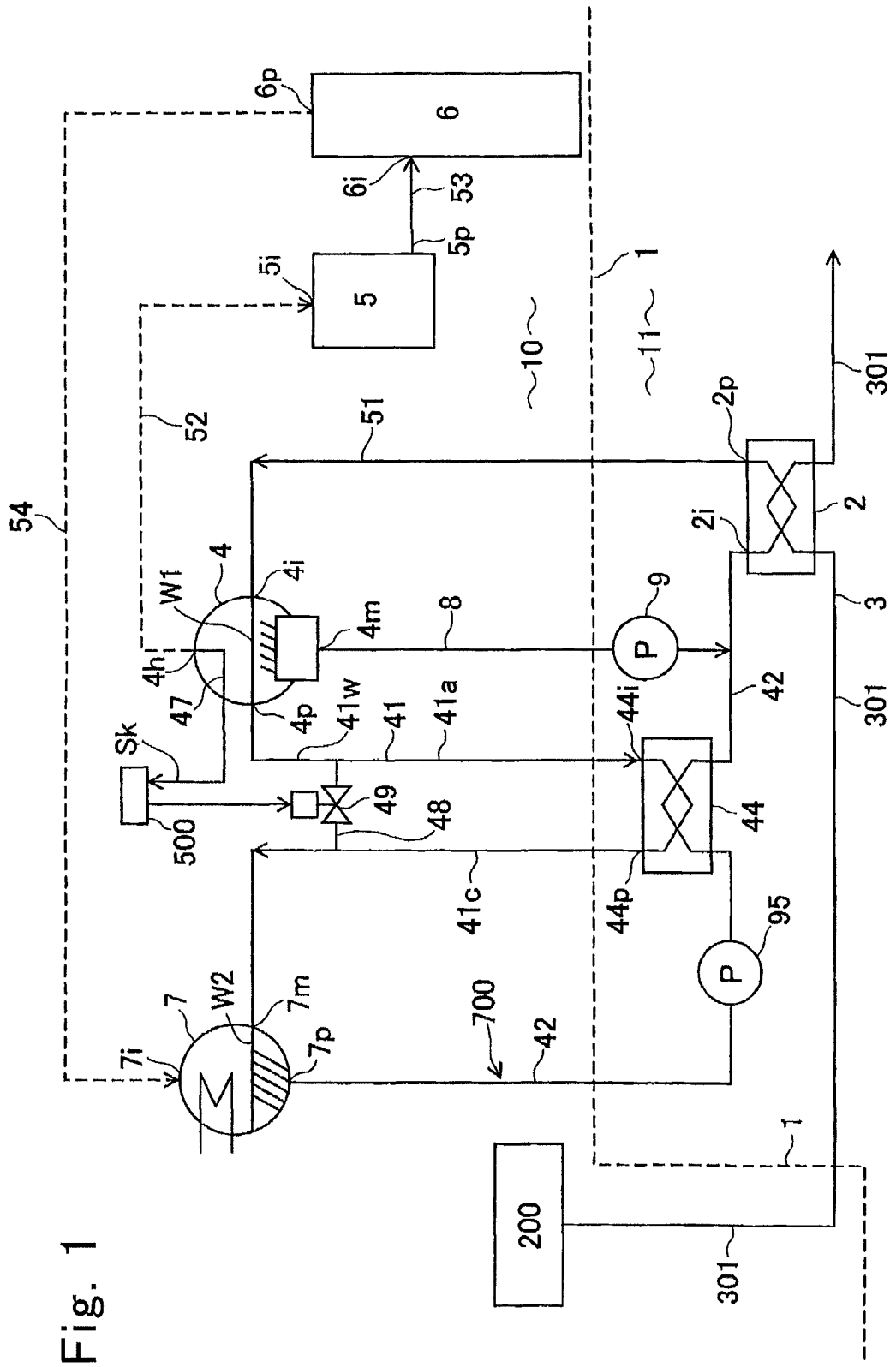
FIG. 1 is a circuit diagram schematically showing an absorption heat pump device according to Example 1.

An in-vehicle absorption heat pump device of this example is mounted on a vehicle. As shown in FIG. 1, the vehicle has an engine room 10 which is space inside the vehicle, and a partition wall 1 for vertically separating the engine room 10 above and vehicle external space 11 below. As shown in FIG. 1, this heat pump device comprises a regenerator 2, an in-vehicle heat source 3, a gas-liquid separator 4, a condenser 5, an evaporator 6, an absorber 7, a bypass passage 8 and a bypass pump 9 serving as a bypass transfer source. The regenerator 2 is a heat exchanger for heating an absorbent in liquid phase. The regenerator 2 is provided in the vehicle external space 11 below the partition wall 1, and accordingly located below the gas-liquid separator 4, the condenser 5, the evaporator 6, and the absorber 7. The in-vehicle heat source 3 is a heat source for heating the absorbent in the regenerator 2, and is constituted by part of an exhaust gas passage 301 for flowing exhaust gas having a high temperature (e.g., 400 to 900 deg. C.) emitted from an engine 200. Employable as the absorbent is a solution of a compound of a halogen and an alkali metal in a solvent. For example, an aqueous lithium bromide solution or an aqueous lithium iodide solution can be employed as the absorbent.

The in-vehicle heat source 3 is disposed in the vehicle external space 11 below the partition wall 1. The gas-liquid separator 4 separates water vapor (gas phase) and the absorbent in liquid phase (liquid phase) from the absorbent heated in the regenerator 2, thereby relatively increasing concentration of the absorbent. Therefore, a first passage 51 is provided which connects a regenerator outlet port 2p of the regenerator 2 and an inlet port 4i of the gas-liquid separator 4. The first passage 51 supplies the absorbent basically upward. The gas-liquid separator 4 is disposed in the engine room 10 above the partition wall 1. In this connection, the condenser 5, the evaporator 6, and the absorber 7 together with the gas-liquid separator 4 are disposed in the engine room 10. In the gas-liquid separator 4, the absorbent in liquid phase gathers on a bottom side, and water vapor in gas phase gathers above a liquid level W1 of the absorbent. The condenser 5 condenses the water vapor separated from the absorbent to form a condensate (water in liquid phase). Therefore, a second passage 52 is provided which extends from a gas phase outlet port 4h of the gas-liquid separator 4 to an inlet port 5i of the condenser 5.

The evaporator 6 evaporates the water in liquid phase (the condensate) condensed in the condenser 5 to form water vapor. Therefore, a third passage 53 is provided which extends from an outlet port 5p of the condenser 5 to an inlet port 6i of the evaporator 6. A fourth passage 54 is provided which extends from an outlet port 6p of the evaporator 6 to a gas phase inlet port 7i of the absorber 7. The absorber 7 brings the absorbent in liquid phase relatively concentrated and increased in viscosity in the gas-liquid separator 4 in contact with the water vapor (gas phase) evaporated in the evaporator 6. This contact causes the highly-viscous absorbent to absorb the water vapor (gas phase), be relatively diluted, and be decreased in viscosity. As schematically shown in FIG. 1, the gas-liquid separator 4 is disposed in almost the same height position as the absorber 7, or in a slightly higher position than the absorber 7 in the engine room 10. This layout arrangement aims to supply the absorbent in the gas-liquid separator 4 to the absorber 7 in accordance with a pressure difference between the gas-liquid separator 4 and the absorber 7.

As shown in FIG. 1, a first supply passage 41 allows a liquid phase outlet port 4p of the gas-liquid separator 4 and a liquid phase inlet port 7m of the absorber 7 to communicate with each other, and the absorbent in liquid phase in the gas-liquid separator 4 to be supplied to the absorber 7 through the liquid phase inlet port 7m. As shown in FIG. 1, the first supply passage 41 has a U-character tube shape, and comprises a downward approach passage 41a extending from the liquid phase outlet port 4p of the gas-liquid separator 4 to an inlet port 44i of the heat exchanger 44, and an upward return passage 41c extending from an outlet port 44p of the heat exchanger 44 to the liquid phase inlet port 7m of the absorber 7. The approach passage 41a transfers the absorbent basically downward. The return passage 41c transfers the absorbent basically upward. In this respect, when a liquid level W1 of the absorbent in the gas-liquid separator 4 is higher than a liquid level W2 of the absorbent in the absorber 7, basically the absorbent having a high viscosity flows in the first supply passage 41 from the gas-liquid separator 4 to the absorber 7 in accordance with a pressure difference between the gas-liquid separator 4 and the absorber 7.

The absorbent diluted and decreased in viscosity in the absorber 7 is supplied from a liquid phase outlet port 7p on a bottom side of the absorber 7 to the regenerator 2. Therefore, a second supply passage 42 is provided which extends from the liquid phase outlet port 7p of the absorber 7 to an inlet port 2i of the regenerator 2. The second supply passage 42 is provided with a circulation pump 95, which serves as an absorbent circulation source. The number of revolutions per unit time of the circulation pump 95 is controlled in accordance with a user request (for example, a cooling load request) to the heat pump device of this example. If the user request increases, the number of revolutions of the circulation pump 95 is increased. If the user request decreases, the number of revolutions of the circulation pump 95 is decreased. The second supply passage 42 supplies the absorbent basically downward from the absorber 7 above to the regenerator 2 below.

According to this example, as shown in FIG. 1, the heat exchanger 44 is provided in both the first supply passage 41 and the second supply passage 42 so as to be capable of exchanging heat between these two passages. The heat exchanger 44 cools the absorbent having a relatively high temperature flowing in the first supply passage 41 by heat exchange, and heats the absorbent having a relatively low temperature flowing in the second supply passage 42 by heat exchange. In this way, according to this example, the heat exchanger 44 cools the relatively high temperature absorbent flowing in the first supply passage 41 from the gas-liquid separator 4 toward the absorber 7 by heat exchange before the absorbent is supplied to the absorber 7. On the other hand, the heat exchanger 44 heats the relatively low temperature absorbent flowing in the second supply passage 42 from the absorber 7 toward the regenerator 2 by heat exchange before the absorbent is supplied to the regenerator 2. In this way, the relatively high temperature absorbent discharged from the gas-liquid separator 4 can be cooled by the heat exchanger 44 before supplied to the absorber 7. This can increase absorption efficiency of the absorbent in absorbing water vapor in the absorber 7. On the other hand, the relatively low temperature absorbent discharged from the absorber 7 can be preheated by the heat exchanger 44 before supplied to the regenerator 2, and this preheating can supplement heating of the absorbent in the regenerator 2. Hence this is advantageous in heating the absorbent into a boiling state, i.e., a gas-liquid mixed state in the regenerator 2.

A circulation passage 700 connecting the regenerator 2, the gas-liquid separator 4, and the absorber 7 is a passage which circulates the absorbent, and comprises the first passage 51, the first supply passage 41 and the second supply passage 42. The circulation passage 700, more specifically, the second supply passage 42 is provided with the circulation pump 95, which serves as an absorbent circulation source. The circulation pump 95 enables the absorbent to circulate in the circulation passage 700 connecting the regenerator 2, the gas-liquid separator 4 and the absorber 7. It should be noted that pressure in the circulation passage 700 is reduced with respect to atmospheric pressure. Therefore, the absorbent heated in the regenerator 2 boils into a gas-liquid mixed state and is supplied to the gas-liquid separator 4. It should be noted that, for example, pressure inside the absorber 7 is about 0.5 to 2 kPa, and pressure inside the condenser 5 is about 5 to 20 kPa. However, the pressure is not limited to these ranges and can be arbitrarily controlled.

According to this example, as shown in FIG. 1, a bypass passage 8 connects a bypass outlet port 4m on a liquid-phase storing bottom side of the gas-liquid separator 4 and a side of the regenerator inlet port 2i of the regenerator 2. The bypass passage 8 is a passage allowing the absorbent in the gas-liquid separator 4 to be supplied directly to the regenerator 2 through the regenerator inlet port 2i without allowing the absorbent to be supplied to the absorber 7. The bypass passage 8 supplies the absorbent downward from the gas-liquid separator 4 above toward the regenerator 2 below. It should be noted that, as mentioned above, the regenerator 2 is provided in the vehicle exterior space 11 and the gas-liquid separator 4 is provided in the engine room 10 above the vehicle exterior space 11. That is to say, the regenerator 2 is disposed below the gas-liquid separator 4. Therefore, gravity can be expected to help transfer of the highly viscous absorbent in the gas-liquid separator 4 to the regenerator 2, depending on a passage diameter of the bypass passage 8.

As shown in FIG. 1, a bypass pump 9, which serves as a bypass transfer source, is provided in the bypass passage 8. The bypass pump 9 actively transfers the absorbent in liquid phase stored in the bottom side of the gas-liquid separator 4 from the bypass outlet port 4m toward the regenerator inlet port 2i of the regenerator 2. Thus, the bypass pump 9 returns the absorbent in liquid phase stored in the gas-liquid separator 4 directly from the regenerator inlet port 2i to the regenerator 2 without supplying the absorbent to the absorber 7. Flow rate of the absorbent to be returned to the regenerator 2 can be increased just by increasing output power of the bypass pump 9. The flow rate of the absorbent to be returned to the regenerator 2 can be decreased just by decreasing the output power of the bypass pump 9.

According to this example, since the in-vehicle heat source 3 radiates a heat exchanger of exhaust gas, the in-vehicle heat source 3 can heat the absorbent in the regenerator 2. The absorbent in the regenerator 2 is heated by the in-vehicle heat source 3 to boil into a gas-liquid mixed state. The absorbent in the gas-liquid mixed state flows from the regenerator outlet port 2p of the regenerator 2 through the first passage 51 and the inlet port 4i to the gas-liquid separator 4. In the gas-liquid separator 4, the liquid phase of the absorbent and water vapor (gas phase) are separated from each other and concentration of the absorbent is relatively increased. Owing to this, the absorbent in liquid phase is concentrated in the gas-liquid separator 4. The concentrated absorbent exhibits a high viscosity. The absorbent in liquid phase thus relatively concentrated in the gas-liquid separator 4 flows from the liquid phase outlet port 4p of the gas-liquid separator 4 to the first supply passage 41, is cooled by heat exchange in the heat exchanger 44, and then flows through the second supply passage 42 and the liquid phase inlet port 7m to the absorber 7. In contrast, the water vapor (gas phase) separated from the absorbent in liquid phase in the gas-liquid separator 4 flows from the gas phase outlet port 4h of the gas-liquid separator 4 through the second passage 52 and the inlet port 5i to the condenser 5 based on a pressure difference. The water vapor is condensed in the condenser 5 to form a condensate (water in liquid phase) while generating latent heat of condensation. The condensate condensed in the condenser 5 flows from the outlet port 5p of the condenser 5 through the third passage 53 and the inlet port 6i to the evaporator 6 based on a pressure difference, and is evaporated in the evaporator 6, thereby forming water vapor in gas phase while absorbing latent heat of evaporation. The water vapor in the evaporator 6 flows from the outlet port 6p through the fourth passage 54 and the gas phase inlet port 7i to the absorber 7 based on a pressure difference.

According to this example, the concentrated absorbent in liquid phase flown from the liquid phase outlet port 4p of the gas-liquid separator 4 through the first supply passage 41 to the absorber 7 contacts the water vapor supplied from the evaporator 6 through the fourth passage 54 to the absorber 7. This contact causes the absorbent concentrated and increased in viscosity to absorb the water vapor (gas phase) and be relatively diluted and decreased in viscosity in the absorber 7. The absorbent diluted in the absorber 7 flows through the second supply passage 42, the heat exchanger 44 and the regenerator inlet port 2i to the regenerator 2, and is heated again by the in-vehicle heat source 3 in the regenerator 2 so as to boil into a gas-liquid mixed state, and then is supplied from the regenerator outlet port 2p of the regenerator 2 through the first passage 51 to the gas-liquid separator 4. The absorbent thus circulates through the regenerator 2, the first passage 51, the gas-liquid separator 4, the first supply passage 41, the absorber 7, and the second supply passage 42. It should be noted that the heat exchanger 44 as well as the regenerator 2 is disposed in the vehicle exterior space 11 below the partition wall 1.

By the way, according to this example, the number of revolutions per unit time (output power) of the circulation pump 95 is controlled in accordance with a user request (for example, a cooling load request) to the heat pump device of this example as mentioned before. However, the circulation pump 95 alone has a limit in further improving performance of the heat pump device of this example. For example, concentration of the absorbent affects the performance of the heat pump device, and in order to control the concentration of the absorbent, it is preferred to control heat exchange efficiency in the regenerator 2, flow rate of the absorbent to be transferred from the regenerator 2 to the gas-liquid separator 4, and gas-liquid separation. However, control of the number of revolutions of the circulation pump 95 alone has a limit in controlling heat exchange efficiency in the regenerator 2.

Therefore, according to this example, the bypass passage 8 is provided as mentioned above which connects the bypass outlet port 4m on the liquid-phase storing bottom side of the gas-liquid separator 4 and the regenerator 2, while bypassing the absorber 7. Furthermore, the bypass pump 9 returning the absorbent in liquid phase stored in the gas-liquid separator 4 to the regenerator 2 while bypassing the absorber 7 is provided in the bypass passage 8. Therefore, when the circulation pump 95 is driven to circulate the absorbent in the circulation passage 700 and heat exchange efficiency in the regenerator 2 is desired to be increased, while the absorbent is circulated in the circulation passage 700 by driving the circulation pump 95, the bypass pump 9 which has been stopped is driven or the number of revolutions (a driving amount) per unit time of the bypass pump 9 is increased. As a result, the absorbent in the gas-liquid separator 4 can be returned directly from the gas-liquid separator 4 to the regenerator 2 without circulated to the absorber 7. Therefore, the flow rate per unit time of the absorbent flowing through the regenerator 2 increases. The absorbent having a thus increased flow rate per unit time can be heated by exchanging heat with the in-vehicle heat source 3 in the regenerator 2. As a result, heat exchange efficiency in heating the absorbent flowing through the regenerator 2, which serves as a heat exchanger, is increased. Accordingly, the flow rate of the absorbent to be transferred from the regenerator 2 to the gas-liquid separator 4 can be increased, and concentration of the absorbent can be controlled in the gas-liquid separator 4.

In contrast, when heat exchange efficiency in the regenerator 2 is desired to be decreased, while the absorbent is circulated in the circulation passage 700 by driving the circulation pump 95, the operation of the bypass pump 9 is stopped or the number of revolutions per unit time (a driving amount) of the bypass pump 9 is decreased. As a result, the flow rate per unit time of the absorbent to be transferred from the bypass outlet port 4m of the gas-liquid separator 4 through the bypass passage 8 and the regenerator inlet port 2i to the regenerator 2 becomes 0 or decreases. Accordingly, when compared to when the number of revolutions per unit time of the bypass pump 9 is great, the flow rate per unit time of the absorbent flowing through the regenerator 2 decreases. Since the absorbent having a thus decreased flow rate per unit time is heated by heat exchange in the regenerator 2, heat exchange efficiency in the regenerator 2, which serves as a heat exchanger, can be decreased. Accordingly, the flow rate of the absorbent to be transferred from the regenerator 2 to the gas-liquid separator 4 can be decreased and concentration of the absorbent can be controlled in the gas-liquid separator 4.

In this way, according to this example, while the circulation pump 95 is driven, the flow rate per unit time of the absorbent flowing through the regenerator 2 can be controlled upon driving the bypass pump 9. Hence, heat exchange efficiency in heating the absorbent flowing through the regenerator 2 by the in-vehicle heat source 3 can be controlled. This is advantageous in controlling concentration of the absorbent, and can improve performance of the heat pump device of this example.

Moreover, according to this example, an intermediate communication passage 48 is provided which allows the liquid phase outlet port 4p of the gas-liquid separator 4 and the liquid phase inlet port 7m of the absorber 7 to communicate with each other so as to bypass the heat exchanger 44. A third on-off valve (an on-off valve) 49 capable of opening and closing the intermediate communication passage 48 and closed in an ordinary mode is provided in the intermediate communication passage 48. The third on-off valve 49 is closed in the ordinary mode. The third on-off valve 49 and the intermediate communication passage 48 are located above the heat exchanger 44 and the regenerator 2. A separator liquid level sensor (a liquid level sensor) 47 for detecting a liquid level W1 of the absorbent in the gas-liquid separator 4 is provided in the gas-liquid separator 4. The separator gas-liquid level sensor 47 is disposed below the gas phase outlet port 4h of the gas-liquid separator 4. A detection signal A1 of the separator liquid level sensor 47 is input to a control unit 500.

The heat exchanger 44 has a passage group comprising a number of passages in order to enhance heat exchange ability. Therefore, in the heat exchanger 44, there is a risk that passage diameters may be decreased due to dust contained in the absorbent, solidification of the absorbent or the like. In this case, the absorbent supplied to the gas-liquid separator 4 may be restricted from flowing to the heat exchanger 44. Hence this absorbent may be restricted from flowing to the absorber 7. In this case, the absorbent supplied to the gas-liquid separator 4 may overflow in the gas-liquid separator 4. There is a risk that the overflown absorbent in liquid phase may flow from the gas phase outlet port 4h of the gas-liquid separator 4 through the second passage 52 to the condenser 5. Since the condenser 5 is to condense water vapor to generate a condensate (water in liquid phase), it is not preferred that the absorbent containing a chemical substance flows into the condenser 5.

Therefore, according to this example, when the liquid level W1 of the absorbent in the gas-liquid separator 4 detected by the separator liquid level sensor 47 is at or above a predetermined height, the control unit 500 opens the third on-off valve 49 based on a detection signal Sk from the separator liquid level sensor 47. Owing to this opening, the absorbent discharged from the liquid phase outlet port 4p of the gas-liquid separator 4 is supplied through a portion 41w which is at the upstream side of the third on-off valve 49 in the approach passage 41a of the first supply passage 41, the intermediate communication passage 48 and the third on-off valve 49 and the liquid phase inlet port 7m to the absorber 7. In this case, flow rate of the absorbent flowing from the liquid phase outlet port 4p of the gas-liquid separator 4 to the heat exchanger 44 is restricted or stopped. Thus the absorbent in the gas-liquid separator 4 is suppressed from overflowing from the gas phase outlet port 4h. Hence, a possible risk of the overflown absorbent flowing from the gas phase outlet port 4h of the gas-liquid separator 4 through the second passage 52 to the condenser 5 can be reduced beforehand. As mentioned above, even if the liquid level W1 of the absorbent in the gas-liquid separator 4 excessively rises for some reason or other, the liquid level W1 of the absorbent in the gas-liquid separator 4 can be automatically lowered by opening the third on-off valve 49 based on the detection signal Sk from the separator liquid level sensor 47. Therefore, gas-liquid separation can be performed in the gas-liquid separator 4 without affected by slight or severe vibration caused by being mounted on a vehicle.

According to this example, in respect to layout arrangement, respective devices including the regenerator 2, the gas-liquid separator 4, the absorber 7, the condenser 5, the evaporator 6 and so on can be disposed at any locations. Therefore, the regenerator 2 for heating the absorbent by using radiated heat of the in-vehicle heat source 3 is disposed in the vehicle exterior space 11 on a floor side of a conventional vehicle in order to use exhaust heat of exhaust gas. That is to say, the regenerator 2 is disposed in vicinity of an exhaust system such as an exhaust gas muffler (see FIG. 1). Moreover, devices other than the regenerator 2, that is to say, respective devices such as the gas-liquid separator 4, the absorber 7, the condenser 5, and the evaporator 6 are disposed in the engine room 10 (see FIG. 1).

Example 2

Figure 2:
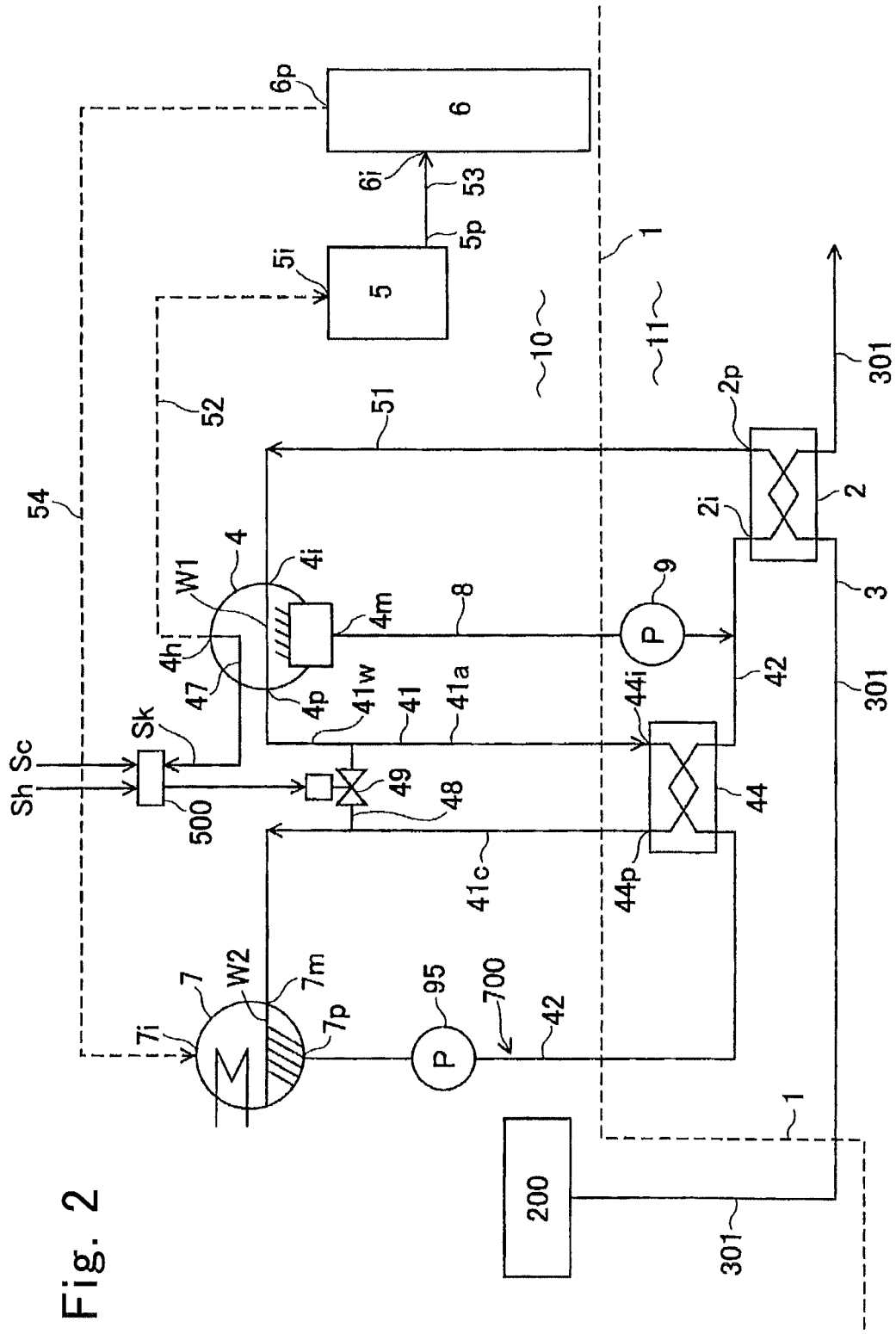
FIG. 2 is a circuit diagram schematically showing an absorption heat pump device according to Example 2.

FIG. 2 shows Example 2. This example has a basically similar structure and basically similar effects to those of Example 1. The control unit 500 controls the bypass pump 9 and the circulation pump 95. An in-vehicle absorption heat pump device of this example has the condenser 5 for generating latent heat of condensation and the evaporator 6 for absorbing latent heat of evaporation, like in Example 1. The latent heat of condensation in the condenser 5 can be used in a heating system such as an air heater for a vehicle. The latent heat of evaporation in the evaporator 6 can be used in a cooling system such as an air cooler for a vehicle and a refrigerator. Therefore, examples of a request load to the in-vehicle absorption heat pump device include a request load to a heating system such as a heating load and a request load to a cooling system such as a cooling load. A signal Sh of a request load to a heating system such as a heating load, a signal Sc of a request load to a cooling system such as a cooling load, and so on are respectively input into the control unit 500 by a vehicle occupant or another control device. The control unit 500 controls the number of revolutions per unit time (rpm) of the bypass pump 9 in accordance with these signals Sh, Sc, etc.

When a request load to the heat pump device such as a heating load and a cooling load is small in this example, while the absorbent is circulated in the circulation passage 700 by driving the circulation pump 95, the bypass pump 9 is stopped or the number of revolutions per unit time of the bypass pump 9 is decreased. This causes the abovementioned flow rate per unit time of the absorbent flowing through the regenerator 2 to become 0 or decrease and accordingly heat exchange efficiency of the absorbent flowing through the regenerator 2 to decrease. In contrast, when a request load to the heat pump device such as a heating load or a cooling load is large, while the absorbent is circulated in the circulation passage 700 by driving the circulation pump 95, the bypass pump 9 is turned on or the number of revolutions per unit time of the bypass pump 9 is increased. It is preferred that thus the flow rate per unit time of the absorbent flowing through the regenerator 2 is increased and heat exchange efficiency of the absorbent flowing through the regenerator 2 is increased. That is to say, the flow rate per unit time of the absorbent flowing through the regenerator 2 is controlled in accordance with a variation in a request load in a heating load or a cooling load.

Moreover, when the amount of exhaust heat radiated from engine exhaust gas is excessively large in this device like when the number of revolutions of the engine is large, the number of revolutions per unit time (output power) of the bypass pump 9 is decreased so that the aforementioned flow rate per unit time of the absorbent flowing through the regenerator 2 is decreased and heat exchange efficiency in the regenerator 2 (heat exchange efficiency) is decreased. In contrast, when the amount of engine exhaust heat is a little insufficient like when the number of revolutions of the engine is small, the number of revolutions per unit time (output power) of the bypass pump 9 is increased so that the flow rate per unit time of the absorbent flowing through the regenerator 2 is increased and heat exchange efficiency in the regenerator 2 is increased. That is to say, it is preferred that the flow rate per unit time of the absorbent flowing through the regenerator 2 is controlled in accordance with a variation in the amount of exhaust heat per unit time radiated from engine exhaust gas.

Example 3

Figure 3:
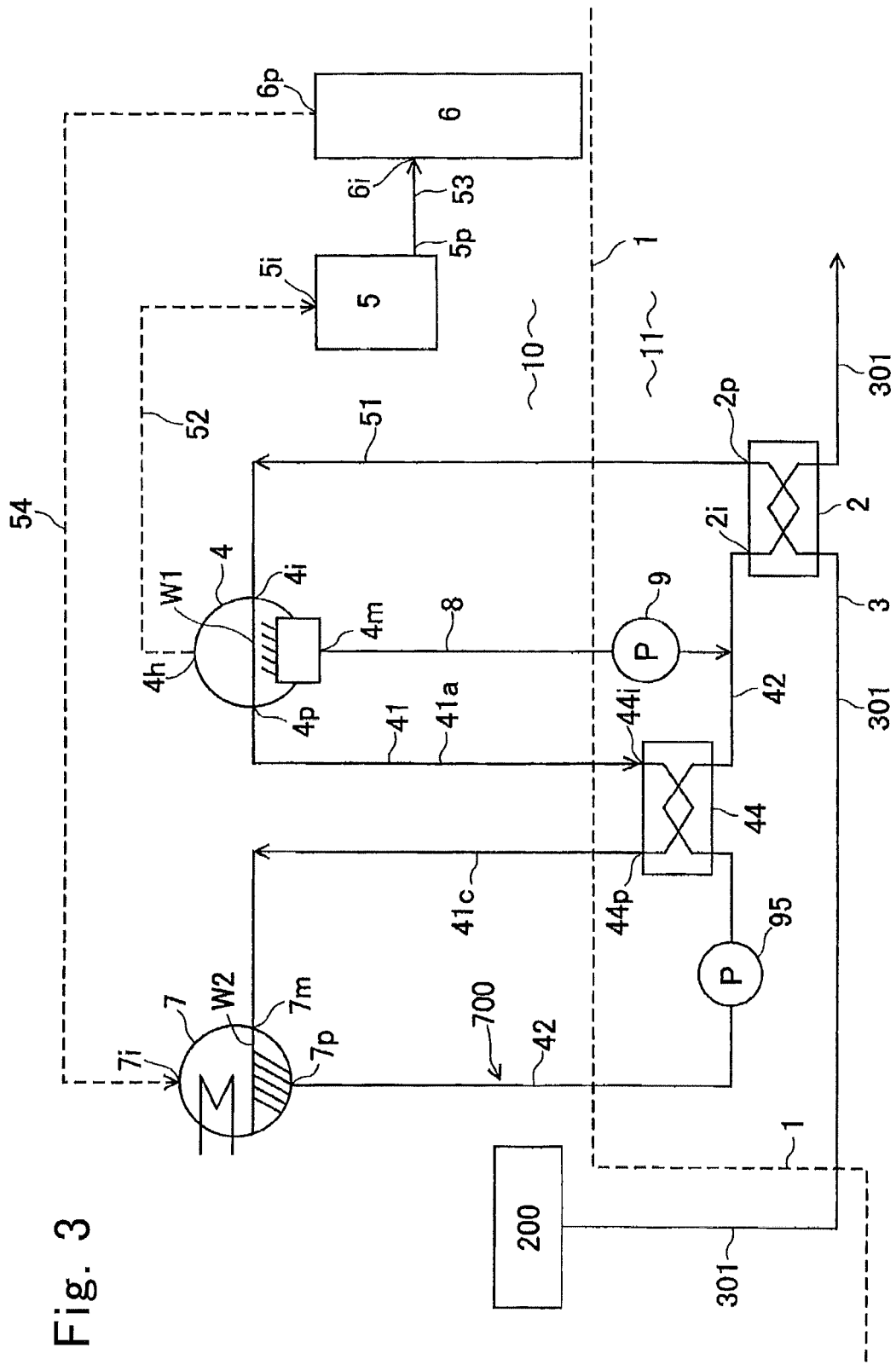
FIG. 3 is a circuit diagram schematically showing an absorption heat pump device according to Example 3.

FIG. 3 shows Example 3. This example has a basically similar structure and basically similar effects to those of Examples 1, 2. As understood from FIG. 3, an in-vehicle absorption heat pump device of this example does not comprise the separator liquid level sensor 47, the third on-off valve 49, or the intermediate communication passage 48. Since the in-vehicle heat source 3 radiates heat in this example, too, the absorbent in the regenerator 2 can be heated. The heated absorbent in the regenerator 2 boils into a gas-liquid mixed state. The absorbent in the gas-liquid mixed state flows from the regenerator 2 through the first passage 51 to the gas-liquid separator 4. In the gas-liquid separator 4, liquid phase of the absorbent and water vapor (gas phase) are separated from each other, concentration of the absorbent is relatively increased and the absorbent in liquid phase is concentrated. The thus concentrated absorbent flows from the liquid phase outlet port 4p of the gas-liquid separator 4 to the first supply passage 41, is cooled by heat exchange in the heat exchanger 44, and then flows to the absorber 7. At this time, water vapor is supplied from the evaporator 6 through the fourth passage 54 to the absorber 7.

According to this example, the concentrated absorbent flown from the gas-liquid separator 4 to the absorber 7 through the first supply passage 41 contacts water vapor supplied from the evaporator 6 to the absorber 7 like in Example 1. This contact relatively dilutes the absorbent. The absorbent diluted in the absorber 7 flows through the second supply passage 42 and the heat exchanger 44 to the regenerator 2, and is heated again by the in-vehicle heat source 3 in the regenerator 2 to boil into a gas-liquid mixed state, and flows from the regenerator 2 through the first passage 51 again to the gas-liquid separator 4. In this way, the absorbent circulates through the regenerator 2, the first passage 51, the gas-liquid separator 4, the first supply passage 41, the absorber 7 and the second supply passage 42.

When heat exchange efficiency in heating the absorbent in the regenerator 2 is to be controlled, the bypass pump 9 is driven also in this example. The flow rate per unit time of the absorbent in the regenerator 2 is increased or reduced upon driving the bypass pump 9.

Example 4

This example has a basically similar structure and basically similar effects to those of Example 1. However, although not shown, an in-vehicle absorption heat pump device of this example does not comprise the heat exchanger, the intermediate communication passage, or the third on-off valve. The gas-liquid separator and the absorber directly communicate with each other through the first supply passage.

Example 5

According to the in-vehicle absorption heat pump device according to the present invention, it is preferred that the gas-liquid separator is provided in an engine room and the regenerator is provided in vehicle exterior space below a partition wall of the engine room. Components of an exhaust gas system for engine exhaust gas are often provided in the vehicle exterior space below the partition wall of the engine room. Therefore, this layout arrangement is suitable to a case in which the in-vehicle heat source for heating the regenerator is an exhaust system component such as a muffler which uses exhaust heat of the engine exhaust gas.

Figure 4:
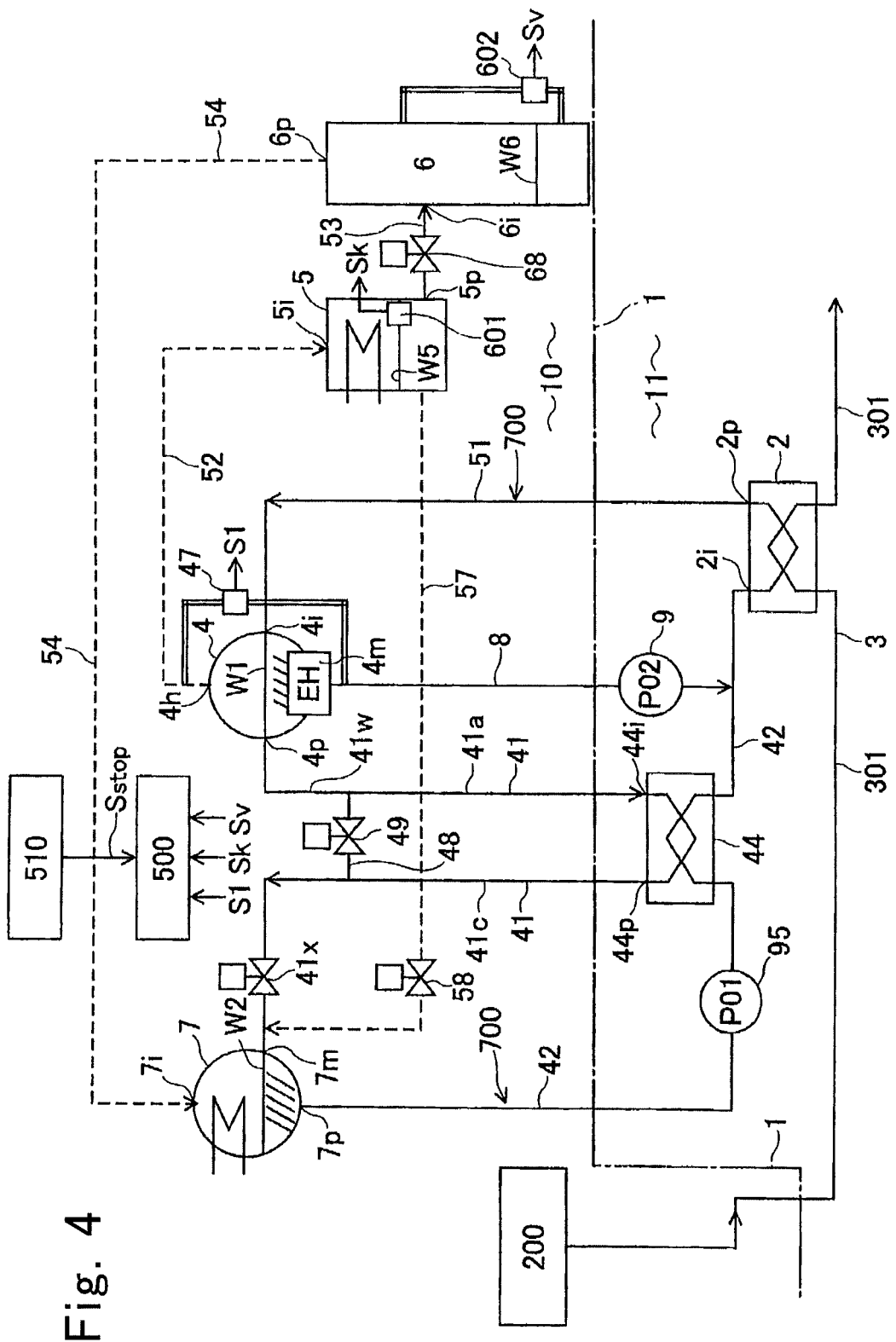
FIG. 4 is a circuit diagram schematically showing an absorption heat pump device according to Example 5.

An in-vehicle absorption heat pump device of this example is mounted on a vehicle. As shown in FIG. 4, the vehicle has an engine room 10 which is space inside the vehicle, and a partition wall 1 for vertically separating the engine room 10 above and vehicle external space 11 below. As shown in FIG. 4, this heat pump device comprises a regenerator 2, an in-vehicle heat source 3, a gas-liquid separator 4, a condenser 5, an evaporator 6, an absorber 7, a bypass passage 8 and a bypass pump 9 serving as a bypass transfer source. The regenerator 2 is a heat exchanger for heating an absorbent in liquid phase. The regenerator 2 is provided in the vehicle external space 11 below the partition wall 1, and accordingly located below the gas-liquid separator 4, the condenser 5, the evaporator 6, and the absorber 7. The in-vehicle heat source 3 is a heat source for heating the absorbent in the regenerator 2, and is constituted by part of an exhaust gas passage 301 for flowing exhaust gas having a high temperature (e.g., 400 to 900 deg. C.) emitted from an engine 200. Employable as the absorbent is a solution of a compound of a halogen and an alkali metal in a solvent. For example, an aqueous lithium bromide solution or an aqueous lithium iodide solution can be employed as the absorbent. When the absorbent is highly concentrated or highly decreased in temperature, solidification of the absorbent more easily proceeds due to crystallization of the absorbent.

As shown in FIG. 4, the in-vehicle heat source 3 is disposed in the vehicle external space 11 below the partition wall 1. The gas-liquid separator 4 separates water vapor (gas phase) and the absorbent in liquid phase (liquid phase) from the absorbent heated in the regenerator 2, thereby relatively increasing concentration of the absorbent. Therefore, a first passage 51 is provided which connects a regenerator outlet port 2p of the regenerator 2 and an inlet port 4i of the gas-liquid separator 4. The first passage 51 supplies the absorbent basically upward. The gas-liquid separator 4 is disposed in the engine room 10 above the partition wall 1. In this connection, the condenser 5, the evaporator 6, and the absorber 7 together with the gas-liquid separator 4 are disposed in the engine room 10. In the gas-liquid separator 4, the absorbent in liquid phase gathers on a bottom side, and water vapor in gas phase gathers above a liquid level W1 of the absorbent. The condenser 5 condenses the water vapor separated from the absorbent to form a condensate (water in liquid phase). Therefore, a second passage 52 is provided which extends from a gas phase outlet port 4h of the gas-liquid separator 4 to an inlet port 5i of the condenser 5.

The evaporator 6 evaporates the water in liquid phase (the condensate) condensed in the condenser 5 to form water vapor. Therefore, a third passage 53 is provided which extends from an outlet port 5p of the condenser 5 to an inlet port 6i of the evaporator 6. A fourth passage 54 is provided which extends from an outlet port 6p of the evaporator 6 to a gas phase inlet port 7i of the absorber 7. The absorber 7 brings the absorbent in liquid phase relatively concentrated and increased in viscosity in the gas-liquid separator 4 in contact with the water vapor (gas phase) evaporated in the evaporator 6. This contact causes the highly viscous absorbent to absorb the water vapor (gas phase), be relatively diluted, and be decreased in viscosity. As schematically shown in FIG. 4, the gas-liquid separator 4 is disposed in almost the same height range as the absorber 7, or in a slightly higher position than the absorber 7 in the engine room 10. This layout arrangement aims to supply the absorbent in the gas-liquid separator 4 to the absorber 7 in accordance with a pressure difference between the gas-liquid separator 4 and the absorber 7.

As shown in FIG. 4, a first supply passage 41 allows a liquid phase outlet port 4p of the gas-liquid separator 4 and a liquid phase inlet port 7m of the absorber 7 to communicate with each other, and the absorbent in liquid phase in the gas-liquid separator 4 to be supplied to the absorber 7 through the liquid phase inlet port 7m. As shown in FIG. 4, the first supply passage 41 has a U-character tube shape, and comprises a downward approach passage 41a extending from the liquid phase outlet port 4p of the gas-liquid separator 4 to an inlet port 44i of the heat exchanger 44, and an upward return passage 41c extending from an outlet port 44p of the heat exchanger 44 to the liquid phase inlet port 7m of the absorber 7, and an inlet port on-off valve 41x for opening and closing the return passage 41c. The approach passage 41a transfers the absorbent basically downward. The return passage 41c transfers the absorbent basically upward. In this respect, when a liquid level W1 of the absorbent in the gas-liquid separator 4 is higher than a liquid level W2 of the absorbent in the absorber 7 and the inlet port on-off valve 41x is opened, basically the absorbent having a high viscosity flows from the gas-liquid separator 4 toward the absorber 7 through the first supply passage 41 in accordance with a pressure difference between the gas-liquid separator 4 and the absorber 7.

The absorbent diluted and decreased in viscosity in the absorber 7 is supplied from a liquid phase outlet port 7p on a bottom side of the absorber 7 toward the regenerator 2. Therefore, a second supply passage 42 is provided which extends from the liquid phase outlet port 7p of the absorber 7 to an inlet port 2i of the regenerator 2. The second supply passage 42 is provided with a circulation pump 95, which serves as an absorbent circulation source. The number of revolutions per unit time of the circulation pump 95 is controlled in accordance with a user request (for example, a cooling load request or a heating load request) to the heat pump device of this example. If the user request requested from an input element 510 such as an operation switch increases, the number of revolutions of the circulation pump 95 is increased. If the user request decreases, the number of revolutions of the circulation pump 95 is decreased. The second supply passage 42 supplies the absorbent basically downward from the absorber 7 above to the regenerator 2 below.

According to this example, as shown in FIG. 4, the heat exchanger 44 is provided in the first supply passage 41 and the second supply passage 42 so as to be capable of exchanging heat between these two passages. The heat exchanger 44 cools the absorbent having a relatively high temperature flowing in the first supply passage 41 by heat exchange, and heats the absorbent having a relatively low temperature flowing in the second supply passage 42 by heat exchange. In this way, according to this example, the heat exchanger 44 cools the relatively high temperature absorbent flowing in the first supply passage 41 from the gas-liquid separator 4 toward the absorber 7 by heat exchange before this absorbent is supplied to the absorber 7. On the other hand, the heat exchanger 44 heats the relatively low temperature absorbent flowing in the second supply passage 42 from the absorber 7 toward the regenerator 2 by heat exchange before this absorbent is supplied to the regenerator 2. In this way, the relatively high temperature absorbent discharged from the gas-liquid separator 4 can be cooled by the heat exchanger 44 before supplied to the absorber 7. This can increase absorption efficiency of the absorbent in absorbing water vapor in the absorber 7. On the other hand, the relatively low temperature absorbent discharged from the absorber 7 can be preheated by the heat exchanger 44 before supplied to the regenerator 2, and this preheating can supplement heating of the absorbent in the regenerator 2. Hence this is advantageous in heating the absorbent into a boiling state, i.e., a gas-liquid mixed state in the regenerator 2.

A circulation passage 700 connecting the regenerator 2, the gas-liquid separator 4, and the absorber 7 is a passage which circulates the absorbent, and comprises the first passage 51, the first supply passage 41 and the second supply passage 42. The circulation passage 700, more specifically, the second supply passage 42 is provided with the circulation pump 95, which serves as an absorbent circulation source. The circulation pump 95 enables the absorbent to circulate in the circulation passage 700 connecting the regenerator 2, the gas-liquid separator 4 and the absorber 7. A control unit 500 for controlling the pumps 95, 9 is provided.

It should be noted that pressure in the circulation passage 700 is reduced with respect to atmospheric pressure. Therefore, the absorbent heated in the regenerator 2 boils into a gas-liquid mixed state and is supplied to the gas-liquid separator 4. It should be noted that for example, while the heat pump device is in operation, pressure P7 inside the absorber 7 is about 0.5 to 2 kPa, pressure P4 inside the gas-liquid separator 4 is about 6 to 25 kPa, and pressure P5 inside the condenser 5 is about 5 to 20 kPa. However, the pressure is not limited to these ranges and can be arbitrarily controlled. While the heat pump device is in operation, or immediately after the operation of the heat pump device stops, a relation P7<P5<P4 is satisfied. Therefore, the absorbent in the gas-liquid separator 4 can flow to the absorber 7 based on a pressure difference. The condensate water in the condenser 5 can flow to the absorber 7 based on a pressure difference.

According to this example, as shown in FIG. 4, a bypass passage 8 connects a bypass outlet port 4m on a liquid-phase storing bottom side of the gas-liquid separator 4 and a side of the regenerator inlet port 2i of the regenerator 2. The bypass passage 8 is a passage allowing the absorbent in the gas-liquid separator 4 to be supplied directly to the regenerator 2 through the regenerator inlet port 2i without allowing the absorbent to be supplied to the absorber 7. The bypass passage 8 supplies the absorbent downward from the gas-liquid separator 4 above toward the regenerator 2 below. It should be noted that, as mentioned above, the regenerator 2 is provided in the vehicle exterior space 11 and the gas-liquid separator 4 is provided in the engine room 10 above the vehicle exterior space 11. That is to say, the regenerator 2 is disposed below the gas-liquid separator 4. Therefore, gravity can be expected to help transfer of the highly viscous absorbent in the gas-liquid separator 4 to the regenerator 2, depending on a passage diameter of the bypass passage 8.

As shown in FIG. 4, a bypass pump 9 serving as a bypass transfer source is provided in the bypass passage 8. The bypass pump 9 actively transfers the absorbent in liquid phase stored in the bottom side of the gas-liquid separator 4 from the bypass outlet port 4m toward the regenerator inlet port 2i of the regenerator 2. Thus, the bypass pump 9 returns the absorbent in liquid phase stored in the gas-liquid separator 4 directly from the regenerator inlet port 2i to the regenerator 2 without supplying the absorbent to the absorber 7. Flow rate of the absorbent to be returned to the regenerator 2 can be increased just by increasing output power of the bypass pump 9. The flow rate of the absorbent to be returned to the regenerator 2 can be decreased just by decreasing output power of the bypass pump 9. It should be noted that the control unit 500 controls the on-off valves 49, 41x, 68 and the pumps 95, 9.

According to this example, since the in-vehicle heat source 3 radiates a heat exchanger of exhaust gas, the in-vehicle heat source 3 can heat the absorbent in the regenerator 2. The absorbent in the regenerator 2 is heated by the in-vehicle heat source 3 so as to boil into a gas-liquid mixed state. The absorbent in the gas-liquid mixed state flows from the regenerator outlet port 2p of the regenerator 2 through the first passage 51 and the inlet port 4i to the gas-liquid separator 4. In the gas-liquid separator 4, the liquid phase of the absorbent and water vapor (gas phase) are separated from each other and concentration of the absorbent is relatively increased. Owing to this, the absorbent in liquid phase is concentrated in the gas-liquid separator 4. The concentrated absorbent exhibits a high viscosity. The absorbent in liquid phase thus relatively concentrated in the gas-liquid separator 4 flows from the liquid phase outlet port 4p of the gas-liquid separator 4 to the first supply passage 41, is cooled by heat exchange in the heat exchanger 44, and then flows through the inlet port on-off valve 41x, the second supply passage 42 and the gas phase inlet port 7i to the absorber 7. In contrast, the water vapor (gas phase) separated from the absorbent in liquid phase in the gas-liquid separator 4 flows from the gas phase outlet port 4h of the gas-liquid separator 4 through the second passage 52 and the inlet port 5i to the condenser 5 based on a pressure difference. The water vapor is condensed in the condenser 5 to form a condensate (water in liquid phase) while generating latent heat of condensation. The condensate condensed in the condenser 5 flows from the outlet port 5p of the condenser 5 through the second on-off valve 68, the third passage 53 and the inlet port 6i to the evaporator 6 based on a pressure difference, and is evaporated in the evaporator 6, thereby forming water vapor in gas phase while absorbing latent heat of evaporation. The water vapor in the evaporator 6 flows from the outlet port 6p through the fourth passage 54 and the gas phase inlet port 7i to the absorber 7 based on a pressure difference.

According to this example, the concentrated absorbent in liquid phase flown from the liquid phase outlet port 4p of the gas-liquid separator 4 through the first supply passage 41 to the absorber 7 contacts the water vapor supplied from the evaporator 6 through the fourth passage 54 and the gas phase inlet port 7i to the absorber 7. This contact causes the absorbent concentrated and increased in viscosity to absorb the water vapor (gas phase) and be relatively diluted and decreased in viscosity in the absorber 7. The absorbent diluted in the absorber 7 flows through the second supply passage 42, the heat exchanger 44 and the regenerator inlet port 2i to the regenerator 2, and is heated again by the in-vehicle heat source 3 in the regenerator 2 so as to boil into a gas-liquid mixed state, and then is supplied from the regenerator outlet port 2p of the regenerator 2 through the first passage 51 to the gas-liquid separator 4. The absorbent thus circulates through the regenerator 2, the first passage 51, the gas-liquid separator 4, the first supply passage 41, the absorber 7, and the second supply passage 42. It should be noted that the heat exchanger 44 as well as the regenerator 2 is disposed in the vehicle exterior space 11 below the partition wall 1.

By the way, if an operation of the heat pump device is stopped, since a request for a heat pump function is stopped, temperature of the absorbent gradually decreases and crystallization of the absorbent in the heat pump device may proceed, depending on environmental conditions, and in some cases, there is a risk that part of the absorbent may solidify. In this case, the solidification may induce clogging of the passages. Therefore, according to this example, a diluent passage 57 is provided as shown in FIG. 4 which allows the condenser 5 and the absorber 7 to communicate with each other. Furthermore, a first on-off valve 58 as a dilution element is provided which performs dilution treatment of causing the condensate water in liquid phase in the condenser 5 to be supplied to the absorber 7 through the diluent passage 57 and diluting the absorbent in the absorber 7. The first on-off valve 58 is controlled by the control unit 500.

When in this situation a signal to stop a request for a heat pump function is input from the input element 510 to the control unit 500, the control unit 500 opens the first on-off valve 58 in a closed state and accordingly allows the condensate water in liquid phase in the condenser 5 to be actively supplied to the absorber 7 through the diluent passage 57 and the absorbent in the absorber 7 to be diluted with the condensate water. This dilution suppresses solidification of the absorbent due to crystallization and prevents clogging of the passages or the like beforehand. A next operation of the heat pump device can also go well. Examples of "stop of a request for a heat pump function" include a stop of an operation of an engine, which is a vehicle driving source, a stop of an operation of the heat pump device in itself, and, in a case where the heat pump function is used for air conditioning, a stop of a request for air conditioning such as air cooling and air heating. The request stop is performed based on an input of the signal from the input element 510 into the control unit 500.

According to this example, if opened, the first on-off valve 58 serving as a dilution element performs dilution treatment of allowing the condensate water in liquid phase in the condenser 5 to be supplied to the absorber 7 based on a pressure difference between the condenser 5 and the absorber 7 and diluting the absorbent in the absorber 7. In the dilution treatment, since the circulation pump 95 continues to be driven, the absorbent diluted in the absorber 7 is transferred and circulates in the circulation passage 700 (the second supply passage 42, the first passage 51, and the first supply passage 41) in this order, and the absorbent circulating in the circulation passage 700 can be prevented from solidifying beforehand. Moreover, in the dilution treatment, since the bypass pump 9 also continues to be driven, the diluted absorbent flows also to the bypass passage 8. The absorbent thus diluted with the condensate water flows in the entire passages of the heat pump device to be flown through by the absorbent, so solidification of the absorbent due to crystallization is suppressed and clogging of the passages or the like can be prevented beforehand. Therefore, a next operation of the heat pump device can also go well and this can contribute to a long service life of the heat pump device.

According to this example, a condenser liquid level sensor 601 for detecting a liquid level of condensate water in liquid phase in the condenser 5 is provided in the condenser 5. A signal Sk of the condenser liquid level sensor 601 is input in the control unit 500. When a liquid level W5 of the condensate water in the condenser 5 detected by the condenser liquid level sensor 601 is in or above a predetermined first height range, the condensate water is sufficiently stored in the condenser 5, and a function to liquid-seal a sealing portion of the condenser 5 with condensate water is maintained. At this time, when a signal $S_{STOP}$ to stop a request for a heat pump function is input in the control unit 500 and there is a risk that the absorbent may solidify, the control unit 500 opens the first on-off valve 58. This allows the condensate water in the condenser 5 to be supplied to the absorber 7 through the diluent passage 57 based on a pressure difference between the condenser 5 in which pressure is relatively high and the absorber 7 in which pressure is relatively low. In this case, the condensate water is supplied based on a pressure difference between the condenser 5 and the absorber 7. However, if the liquid level W5 of the condensate water in the condenser 5 is below the first height range, the condensate water in the condenser 5 is excessively decreased and this decrease affects liquid sealing properties of the condenser 5, so the control unit 500 closes the first on-off valve 58 and stops transfer of the condensate water in the condenser 5.

According to this example, a second on-off valve 68 for allowing the condensate water in the condenser 5 to be supplied to the evaporator 6 upon being opened is provided in the third passage 53 connecting the condenser 5 and the evaporator 6. An evaporator liquid level sensor 602 for detecting a liquid level W6 of the condensate water in liquid phase to be evaporated in the evaporator 6 is provided in the evaporator 6. A signal Sv of the evaporator liquid level sensor 602 is input in the control unit 500. When the liquid level W6 of the condensate water in the evaporator 6 detected by the evaporator liquid level sensor 602 is in or above a second height range, the control unit 500 closes the second on-off valve 68. This inhibits the condensate water in the condenser 5 from flowing to the evaporator 6. As a result, the liquid level W5 of the condensate water in the condenser 5 is maintained and liquid sealing properties of the condenser 5 are maintained.

Moreover, according to this example, an intermediate communication passage 48 is provided which allows the liquid phase outlet port 4p of the gas-liquid separator 4 and the liquid phase inlet port 7m of the absorber 7 to communicate with each other so as to bypass the heat exchanger 44.

A third on-off valve (an on-off valve) 49 capable of opening and closing the intermediate communication passage 48 and closed in an ordinary mode is provided in the intermediate communication passage 48. The third on-off valve 49 is closed in an ordinary mode. The third on-off valve 49 and the intermediate communication passage 48 are located above the heat exchanger 44 and the regenerator 2. A separator liquid level sensor 47 for detecting a liquid level W1 of the absorbent in the gas-liquid separator 4 is provided in the gas-liquid separator 4. The separator gas-liquid level sensor 47 is disposed below the gas phase outlet port 4h of the gas-liquid separator 4. A detection signal S1 of the separator liquid level sensor 47 is input to the control unit 500.

By the way, the heat exchanger 44 has a passage group comprising a number of passages in order to enhance heat exchange ability. Therefore, in the heat exchanger 44, there is a risk that passage diameters may be decreased due to dust contained in the absorbent, solidification of the absorbent or the like. In this case, the absorbent supplied to the gas-liquid separator 4 may be restricted from flowing to the heat exchanger 44. Hence this absorbent may be restricted from flowing to the absorber 7. In this case, the absorbent supplied to the gas-liquid separator 4 may overflow in the gas-liquid separator 4. There is a risk that the overflown absorbent in liquid phase may flow from the gas phase outlet port 4h of the gas-liquid separator 4 through the second passage 52 to the condenser 5. Since the condenser 5 is to condense water vapor to generate a condensate (water in liquid phase), it is not preferred that the absorbent containing a chemical substance flows into the condenser 5.

Therefore, according to this example, when the liquid level W1 of the absorbent in the gas-liquid separator 4 detected by the separator liquid level sensor 47 is in or above a predetermined third height range, the control unit 500 opens the third on-off valve 49 based on a detection signal S1 from the separator liquid level sensor 47. Owing to this opening, the absorbent discharged from the liquid phase outlet port 4p of the gas-liquid separator 4 is supplied through a portion 41w which is at the upstream side of the third on-off valve 49 in the approach passage 41a of the first supply passage 41, the intermediate communication passage 48, the third on-off valve 49, the inlet port on-off valve 41x and the liquid phase inlet port 7m to the absorber 7. Thus the absorbent in the gas-liquid separator 4 is suppressed from overflowing from the gas phase outlet port 4h. Hence, a possible risk of the overflown absorbent flowing from the gas phase outlet port 4h of the gas-liquid separator 4 through the second passage 52 to the condenser 5 can be reduced beforehand. As mentioned above, even if the liquid level W1 of the absorbent in the gas-liquid separator 4 excessively rises for some reason or other, the liquid level W1 of the absorbent in the gas-liquid separator 4 can be automatically lowered by opening the third on-off valve 49 based on the detection signal S1 from the separator liquid level sensor 47. Therefore, gas-liquid separation can be performed in the gas-liquid separator 4 without affected by slight or severe vibration due to being mounted on a vehicle.

According to this example, in respect to layout arrangement, respective devices including the regenerator 2, the gas-liquid separator 4, the absorber 7, the condenser 5, the evaporator 6 and so on can be disposed at any locations. Therefore, the regenerator 2 for heating the absorbent by using radiated heat of the in-vehicle heat source 3 is disposed in the vehicle exterior space 11 on a floor side of a conventional vehicle so as to use exhaust heat of exhaust gas. That is to say, the regenerator 2 is disposed in vicinity of an exhaust system such as an exhaust gas muffler (see FIG. 4). Moreover, devices other than the regenerator 2, that is to say, respective devices such as the gas-liquid separator 4, the absorber 7, the condenser 5, and the evaporator 6 are disposed in the engine room 10 (see FIG. 4).

As mentioned before, the number of revolutions per unit time (output power) of the circulation pump 95 is controlled in accordance with a user request (for example, a cooling load request) to the heat pump device of this example. However, the circulation pump 95 alone has a limit in further improving performance of the heat pump device of this example. For example, concentration of the absorbent affects the performance of the heat pump device, and in order to control the concentration of the absorbent, it is preferred to control heat exchange efficiency in the regenerator 2, flow rate of the absorbent to be transferred from the regenerator 2 to the gas-liquid separator 4, and gas-liquid separation. However, control of the number of revolutions of the circulation pump 95 alone has a limit in controlling the heat exchange efficiency in the regenerator 2.

Therefore, according to this example, the bypass passage 8 is provided as mentioned above which connects the bypass outlet port 4m on the liquid phase storing bottom side of the gas-liquid separator 4 and the regenerator 2, while bypassing the absorber 7. Furthermore, the bypass pump 9 returning the absorbent in liquid phase stored in the gas-liquid separator 4 directly to the regenerator 2 while bypassing the absorber 7 is provided in the bypass passage 8. Therefore, when the circulation pump 95 is driven to circulate the absorbent in the circulation passage 700 and heat exchange efficiency in the regenerator 2 is desired to be increased, while the absorbent is circulated in the circulation passage 700 by driving the circulation pump 95, the bypass pump 9 which has been stopped is driven or the number of revolutions per unit time (a driving amount) of the bypass pump 9 is increased. As a result, the absorbent in the gas-liquid separator 4 can be returned directly from the gas-liquid separator 4 to the regenerator 2 without circulated to the absorber 7. Therefore, the flow rate per unit time of the absorbent flowing through the regenerator 2 increases. The absorbent having a thus increased flow rate per unit time can be heated by exchanging heat with the in-vehicle heat source 3 in the regenerator 2. As a result, heat exchange efficiency in heating the absorbent flowing through the regenerator 2, which serves as a heat exchanger, is increased. Accordingly, the flow rate of the absorbent to be transferred from the regenerator 2 to the gas-liquid separator 4 can be increased, and concentration of the absorbent can be controlled in the gas-liquid separator 4.

In contrast, when heat exchange efficiency in the regenerator 2 is desired to be decreased, while the absorbent is circulated in the circulation passage 700 by driving the circulation pump 95, the operation of the bypass pump 9 is stopped or the number of revolutions per unit time (a driving amount) of the bypass pump 9 is decreased. As a result, the flow rate per unit time of the absorbent to be transferred from the bypass outlet port 4m of the gas-liquid separator 4 through the bypass passage 8 and the regenerator inlet port 2i to the regenerator 2 becomes 0 or decreases. Accordingly, when compared to when the number of revolutions per unit time of the bypass pump 9 is great, the flow rate per unit time of the absorbent flowing through the regenerator 2 decreases. Since the absorbent having a thus decreased flow rate per unit time is heated by heat exchange in the regenerator 2, heat exchange efficiency in the regenerator 2, which serves as a heat exchanger, can be decreased. Accordingly, the flow rate of the absorbent to be transferred from the regenerator 2 to the gas-liquid separator 4 can be decreased and concentration of the absorbent can be controlled in the gas-liquid separator 4.

In this way, according to this example, while the circulation pump 95 is driven, the flow rate per unit time of the absorbent flowing through the regenerator 2 can be controlled upon driving the bypass pump 9. Hence, heat exchange efficiency in heating the absorbent flowing through the regenerator 2 by the in-vehicle heat source 3 can be controlled. This is advantageous in controlling concentration of the absorbent, and can improve performance of the heat pump device of this example.

According to this example, following configurations can be employed, if necessary. In order to secure flow of the condensate water in the diluent passage 57, height of a bottom portion of the condenser 5 can be set to be higher than that of the absorber 7. In this case, even when there is no pressure difference between the condenser 5 and the absorber 7, the condensate water in the condenser 7 can be supplied to the absorber 7. A passage diameter of the diluent passage 57 can be increased with respect to that of the fourth passage 54.

Example 6

Figure 5:
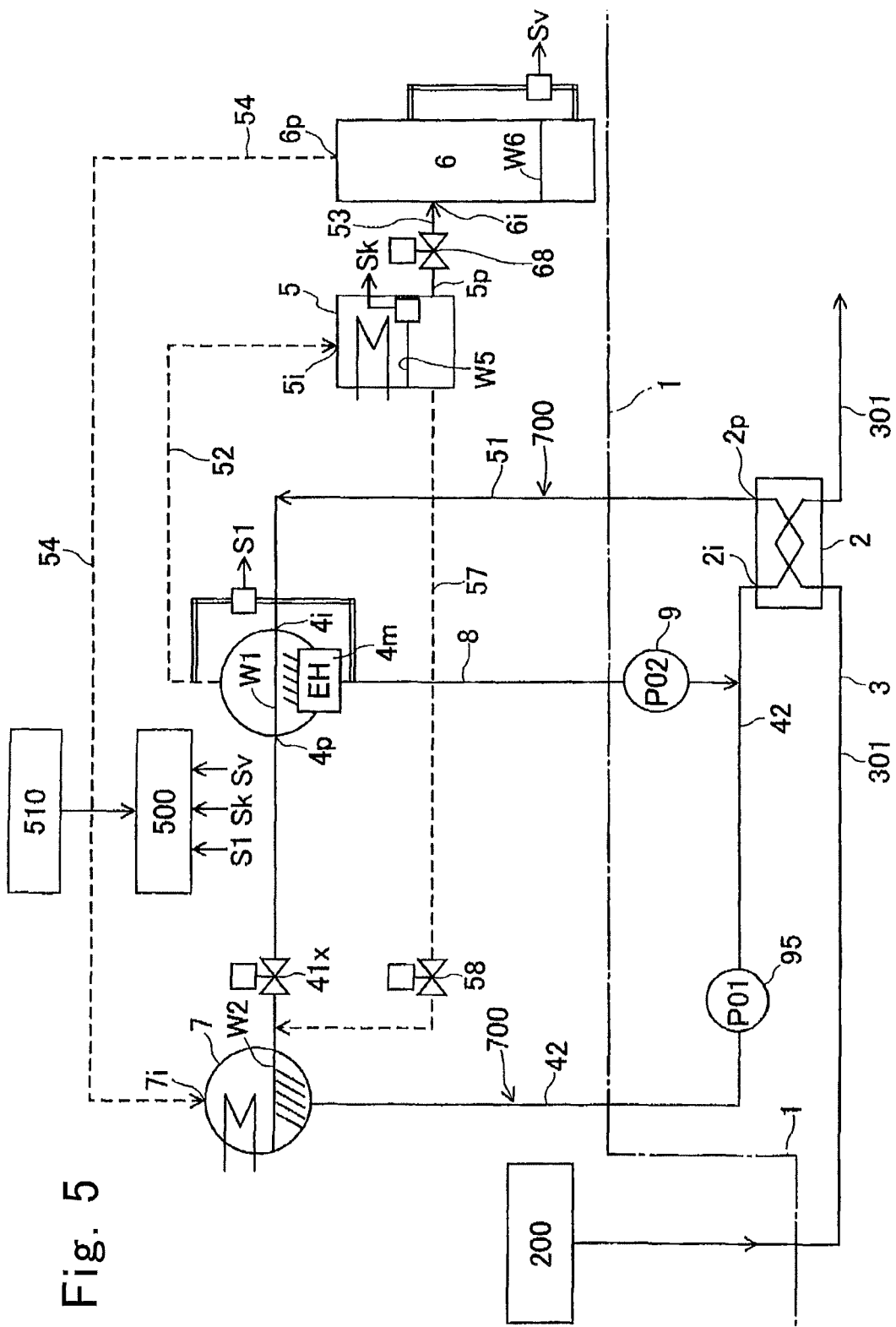
FIG. 5 is a circuit diagram schematically showing an absorption heat pump device according to Example 6.

FIG. 5 shows Example 6. This example has a basically similar structure and basically similar effects to those of Example 5. As understood from FIG. 5, an absorption heat pump device of this example does not comprise the heat exchanger 44, the third on-off valve 49 or the intermediate communication passage 48. If an operation of the heat pump device is stopped and a request for a heat pump function is stopped, also in this example there is a risk that crystallization of the absorbent may proceed and part of the absorbent may solidify. Therefore, when the request for the heat pump function is stopped, the control unit 500 opens the first on-off valve 58 so as to perform dilution treatment of allowing condensate water in liquid phase stored in the condenser 5 to be supplied to the absorber 7 based on a pressure difference between the condenser 5 and the absorber 7 and diluting the absorbent in the absorber 7. This dilution treatment suppresses solidification of the absorbent due to crystallization and prevents clogging of the passages or the like beforehand. A next operation of the heat pump device can also go well. In such a dilution treatment, the circulation pump 95 and the bypass pump 9 continue to be driven. Therefore, the absorbent diluted in the absorber 7 is transferred and circulates in the circulation passage 700 (the second supply passage 42, the first passage 51 and the first supply passage 41) in this order, and the absorbent circulating in the circulation passage 700 can be prevented from solidifying beforehand. Moreover, since the bypass pump 9 also continues to be driven, the diluted absorbent also flows to the bypass passage 8. The absorbent thus diluted with condensate water flows in the entire passages of the heat pump device to be flown through by the absorbent, so solidification of the absorbent due to crystallization is suppressed and clogging of the passages or the like can be prevented beforehand. Therefore, a next operation of the heat pump device can also go well and this can contribute to a long service life of the heat pump device.

Example 7

Figure 6:
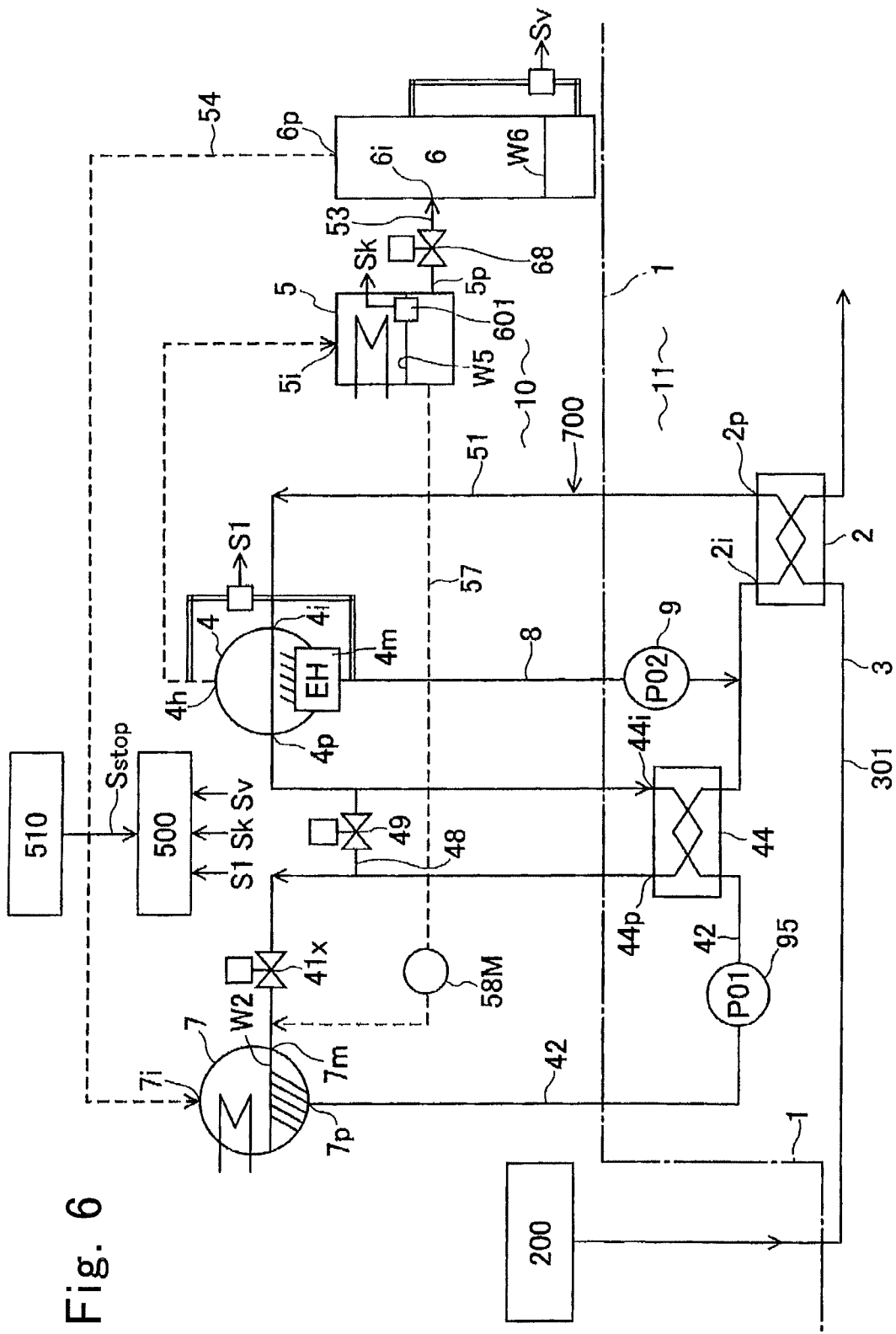
FIG. 6 is a circuit diagram schematically showing an absorption heat pump device according to Example 7.

FIG. 6 shows Example 7. This example has a basically similar structure and basically similar effects to those of Example 5. As understood from FIG. 6, an absorption heat pump device of this example comprises a diluent passage 57 allowing the condenser 5 and the absorber 7 to communicate with each other. This heat pump device further comprises a dilution pump serving as a dilution element which, when a request for a heat pump function of the heat pump device is stopped, performs dilution treatment of causing the condensate water in liquid phase in the condenser 5 to be supplied to the absorber 7 through the diluent passage 57 and diluting the absorbent in the absorber 7. When the request for the heat pump function is thus stopped, the dilution pump 58M is driven to supply the condensate water in liquid phase in the condenser 5 to the absorber 7 through the diluent passage 57 and dilute the absorbent in the absorber 7 with condensate water. This dilution suppresses solidification of the absorbent due to crystallization and prevents clogging of the passages or the like beforehand. A next operation of the heat pump device can also go well. Even when the condenser 5 and the absorber 7 have a small pressure difference, the absorbent in the absorber 7 can be diluted by supplying the condensate water stored in the condenser 5 to the absorber 7.

Other Examples

Figure 7:
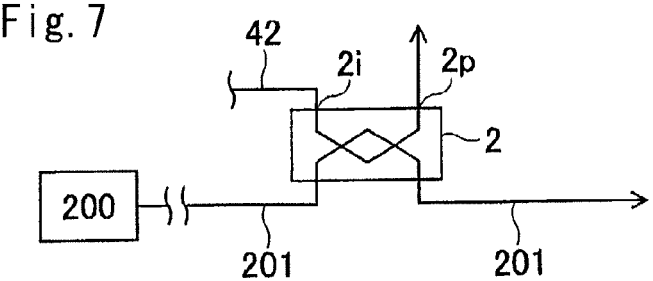
FIG. 7 is a schematic diagram showing a form of heating a regenerator according to another example.
Figure 8:
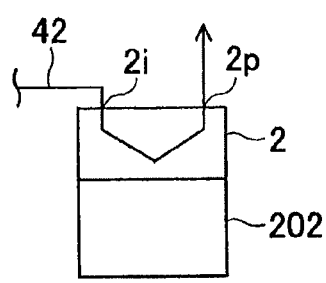
FIG. 8 is a schematic diagram showing a form of heating a regenerator according to another example.
Figure 9:
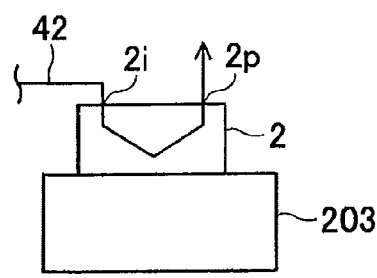
FIG. 9 is a schematic diagram of a form of heating a regenerator according to another example.
Figure 10:
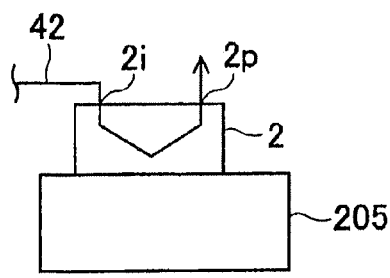
FIG. 10 is a schematic diagram of a form of heating a regenerator according to another example.

FIGS. 7 to 10 schematically show other examples. In FIG. 7, a coolant passage 201 (an in-vehicle heat source) for flowing a heated engine coolant which has cooled the engine 200 and the regenerator 2 are disposed so as to be capable of thermally contacting each other. In an example shown in FIG. 8, an in-vehicle motor 202 (an in-vehicle heat source) and the regenerator 2 are provided so as to be capable of thermally contacting each other. In an example shown in FIG. 9, an in-vehicle inverter 203 for controlling the in-vehicle motor 202 (an in-vehicle heat source) and the regenerator 2 are provided so as to be capable of thermally contacting each other. In an example shown in FIG. 10, an in-vehicle battery 205 for storing electric energy (an in-vehicle heat source) radiates heat, when in operation. The in-vehicle battery 205 and the regenerator 2 are provided so as to be capable of thermally contacting each other. Examples of the in-vehicle battery 205 include chemical batteries such as lithium ion batteries and nickel hydride batteries, and physical batteries such as electric double layer capacitors and lithium ion capacitors. The coolant passage 201, the in-vehicle battery 205, the in-vehicle motor 202, the in-vehicle inverter 203 and the like mentioned above can be disposed in the engine room or in any locations other than the engine room, that is to say, only have to be mounted on a vehicle. Moreover, the present invention is not limited to the examples described above and shown in the drawings, and various modifications are possible without departing the gist of the present invention.

Others

In Examples 1, 5, the regenerator 2 is disposed in vicinity of the exhaust gas muffler disposed in the vehicle exterior space 11 on the floor side, and devices other than the regenerator 2, that is, devices such as the gas-liquid separator 4, the absorber 7, the condenser 5, and the evaporator 6 are disposed in the engine room 10. However, the layout arrangement is not limited to this. Accordingly, the regenerator 2 can be disposed in the engine room 10. The gas-liquid separator 4, the absorber 7, the condenser 5, the evaporator 6 and so on can be disposed outside of the engine room 10. The vehicle is not limited to passenger cars, trucks, dump trucks, and buses, and moreover examples of the vehicle include gasoline-powered vehicles, diesel-powered vehicles, LPG gas-powered vehicles, hybrid vehicles having both a travel motor and an engine, electric vehicles having both a battery device and a travel motor. That is to say, the vehicle can be anything which travels by rotation of wheels. The in-vehicle absorption heat pump device is not limited to those used for air conditioning such as cooling or heating air in vehicles, and can be those used in refrigeration cycles for exhibiting a refrigeration function. Although the pumps 9, 95 and the heat exchanger 44 are disposed in the vehicle exterior space 11 in FIG. 1 and FIG. 4, the layout arrangement is not limited to this and these devices can be disposed in the engine room 10.

In Example 5, the condenser liquid level sensor 601 is provided in the condenser 5, and the liquid level sensor 602 is provided in the evaporator 6. However, if a sufficiently high water level of the condensate water in the condenser 5 is secured, the condenser liquid level sensor 601 and the evaporator liquid level sensor 602 can be omitted. The present invention is not limited to the examples described above and shown in the drawings and various modifications are possible without departing the gist of the present invention. The following technical ideas can be grasped from the present description.

(Appendix 1) An in-vehicle absorption heat pump device, comprising a regenerator for heating an absorbent; an in-vehicle heat source for heating the absorbent in the regenerator; a gas-liquid separator for separating gas phase and liquid phase from the absorbent heated by the in-vehicle heat source in the regenerator so as to relatively increase concentration of the absorbent; a condenser for condensing the gas phase separated from the absorbent to form a condensate; an evaporator for evaporating the condensate condensed in the condenser to form vapor; and an absorber for bringing the absorbent in liquid phase relatively concentrated by the separation of the gas phase in the gas-liquid separator in contact with the vapor evaporated in the evaporator so as to cause the absorbent to absorb the gas phase and be relatively diluted and allow the diluted absorbent to be supplied to the regenerator; an absorbent circulation source for circulating the absorbent in a circulation passage connecting the regenerator, the gas-liquid separator and the absorber; wherein the absorption heat pump device further comprises a first supply passage allowing a liquid phase outlet port of the gas-liquid separator and an inlet port of the absorber to communicate with each other, and the absorbent in liquid phase in the gas-liquid separator to be supplied to the absorber; a second supply passage allowing an outlet port of the absorber and an inlet port of the regenerator to communicate with each other, and the absorbent in the absorber to be supplied to the regenerator; and a heat exchanger provided heat-exchangeably in the first supply passage and the second supply passage, and cooling the absorbent flowing in the first supply passage and heating the absorbent flowing in the second supply passage toward the regenerator. The absorbent before and after being supplied to the absorber can exchange heat with each other by the heat exchanger.

(Appendix 2) The in-vehicle absorption heat pump device according to Appendix 1, wherein the in-vehicle absorption pump device comprises an intermediate communication passage allowing a side of the liquid phase outlet port of the gas-liquid separator and a side of the inlet port of the absorber to communicate with each other so as to bypass the heat exchanger, a third on-off valve capable of opening and closing the intermediate communication passage and closed in an ordinary mode, and a separator liquid level sensor for detecting a liquid level of the absorbent in the gas-liquid separator, and when the liquid level of the absorbent in the gas-liquid separator detected by the separator liquid level sensor is in or above a third height range, the third on-off valve is opened based on a signal of the separator liquid level sensor so that the absorbent in the gas-liquid separator is supplied to the absorber while bypassing the heat exchanger. The absorbent in the gas-liquid separator can be suppressed from overflowing to a condenser side.

REFERENCE SIGNS LIST

1: partition wall, 10: engine room, 11: vehicle exterior space, 2: regenerator 2: in-vehicle heat source, 4: gas-liquid separator, 41: first supply passage, 42: second supply passage, 44: heat exchanger, 47: separator liquid level sensor, 48: intermediate communication passage, 49: third on-off valve, 5: condenser, 51: first passage, 52: second passage, 53: third passage, 54: fourth passage, 57: diluent passage, 58: first on-off valve (dilution element), 6: evaporator, 7: absorber, 8: bypass passage, 9: bypass pump (bypass transfer source), 95: circulation pump (absorbent circulation source), 200: engine, 201: coolant passage (in-vehicle heat source), 202: in-vehicle motor (in-vehicle heat source), 203: in-vehicle inverter (in-vehicle heat source), 205: in-vehicle battery (in-vehicle heat source), 500: control unit, 601: condenser liquid level sensor, 602: evaporator liquid level sensor, 700: circulation passage

The invention claimed is:

1. An in-vehicle absorption heat pump device, comprising:
   a regenerator for heating an absorbent;
   an in-vehicle heat source for heating the absorbent in the regenerator;
   a gas-liquid separator for separating gas phase and liquid phase from the absorbent heated by the in-vehicle heat source in the regenerator so as to relatively increase concentration of the absorbent;
   a condenser for condensing the gas phase separated from the absorbent to form a condensate;
   an evaporator for evaporating the condensate condensed in the condenser to form vapor;
   an absorber for bringing the absorbent in liquid phase relatively concentrated by the separation of the gas phase in the gas-liquid separator in contact with the gas phase evaporated in the evaporator so as to cause the absorbent to absorb the gas phase and be relatively diluted and allow the diluted absorbent to be supplied to the regenerator;
   an absorbent circulation source for circulating the absorbent in a circulation passage connecting the regenerator, the gas-liquid separator and the absorber;
   a bypass passage connecting a liquid-phase storing portion of the gas-liquid separator and the regenerator while bypassing the absorber;
   a bypass transfer source provided in the bypass passage, transferring the absorbent in liquid phase stored in the gas-liquid separator from the gas-liquid separator to the regenerator while bypassing the absorber, and
   a control unit for controlling an amount of the absorbent to be transferred by the bypass transfer source in accordance with at least one of a request load to the in-vehicle absorption heat pump device by a user, and an amount of radiated heat per unit time of the in-vehicle heat source.

2. The in-vehicle absorption heat pump device according to claim 1, wherein when heat exchange efficiency in the regenerator is desired to be increased, the absorbent in the gas-liquid separator is directly returned from the gas-liquid separator to the regenerator through the bypass passage without circulating from the gas-liquid separator to the absorber through the circulation passage.

3. The in-vehicle absorption heat pump device according to claim 1, wherein when heat exchange efficiency in the regenerator is desired to be decreased, while the absorbent is circulated in the circulation passage from the gas-liquid separator through the absorber to the regenerator by the absorbent circulation source, the bypass transfer source for bypassing the absorbent from the gas-liquid separator to the regenerator is stopped or decreased in a driving amount.

4. The in-vehicle absorption heat pump device according to claim 1, comprising:
   a first supply passage allowing a liquid phase outlet port of the gas-liquid separator and an inlet port of the absorber to communicate with each other and the absorbent in liquid phase in the gas-liquid separator to be supplied to the absorber;
   a second supply passage allowing an outlet port of the absorber and an inlet port of the regenerator to communicate with each other, and the absorbent in the absorber to be supplied to the regenerator; and
   a heat exchanger provided in the first supply passage and the second supply passage, and cooling the absorbent flowing in the first supply passage toward the absorber and heating the absorbent flowing in the second supply passage toward the regenerator.

5. The in-vehicle absorption heat pump device according to claim 4, wherein the in-vehicle absorption pump device comprises an intermediate communication passage allowing a side of the liquid phase outlet port of the gas-liquid separator and a side of the inlet port of the absorber to communicate with each other so as to bypass the heat exchanger, an on-off valve capable of opening and closing the intermediate communication passage and closed in an ordinary mode, and a separator liquid level sensor for detecting a liquid level of the absorbent in the gas-liquid separator, and when the liquid level of the absorbent in the gas-liquid separator detected by the separator liquid level sensor is in or above a height range, the on-off valve is opened based on a signal of the separator liquid level sensor so that the absorbent in the gas-liquid separator is supplied to the absorber while bypassing the heat exchanger.

6. The in-vehicle absorption heat pump device according to claim 4, wherein the heat exchanger cools the absorbent having a relatively high temperature flowing in the first supply passage by heat exchange, and heats the absorbent having a relatively low temperature flowing in the second supply passage by heat exchange.

7. The in-vehicle absorption heat pump device according to claim 4, wherein the heat exchanger cools the absorbent having a relatively high temperature flowing in the first supply passage from the gas-liquid separator toward the absorber by heat exchange before the absorbent is supplied to the absorber, and heats the absorbent having a relatively low temperature flowing in the second supply passage from the absorber toward the regenerator by heat exchange before the absorbent is supplied to the regenerator.

8. The in-vehicle absorption heat pump device according to claim 1, wherein the in-vehicle heat source is at least one of an exhaust pipe for flowing exhaust gas exhausted from an in-vehicle engine, a coolant passage for flowing an engine coolant, an in-vehicle motor, an in-vehicle inverter for controlling the in-vehicle motor, and an in-vehicle battery for storing electric energy.

9. The in-vehicle absorption heat pump device according to claim 1, wherein the gas-liquid separator is provided in an engine room and the regenerator is provided in vehicle external space below a partition wall partitioning the engine room.

10. An in-vehicle absorption heat pump device, comprising:
   a regenerator for heating an absorbent;
   an in-vehicle heat source for heating the absorbent in the regenerator;
   a gas-liquid separator for separating gas phase and liquid phase from the absorbent heated by the in-vehicle heat source in the regenerator so as to relatively increase concentration of the absorbent;
   a condenser for condensing the gas phase separated from the absorbent to form a condensate;
   an evaporator for evaporating the condensate condensed in the condenser to form vapor;
   an absorber for bringing the absorbent in liquid phase relatively concentrated by the separation of the gas phase in the gas-liquid separator in contact with the gas phase evaporated in the evaporator so as to cause the absorbent to absorb the gas phase and be relatively diluted and allow the diluted absorbent to be supplied to the regenerator;
   an absorbent circulation source for circulating the absorbent in a circulation passage connecting the regenerator, the gas-liquid separator and the absorber;
   a bypass passage connecting a liquid-phase storing portion of the gas-liquid separator and the regenerator while bypassing the absorber;
   a bypass transfer source provided in the bypass passage, transferring the absorbent in liquid phase stored in the gas-liquid separator from the gas-liquid separator to the regenerator while bypassing the absorber;
   a first supply passage allowing a liquid phase outlet port of the gas-liquid separator and an inlet port of the absorber to communicate with each other and the absorbent in liquid phase in the gas-liquid separator to be supplied to the absorber;
   a second supply passage allowing an outlet port of the absorber and an inlet port of the regenerator to communicate with each other, and the absorbent in the absorber to be supplied to the regenerator; and
   a heat exchanger provided in the first supply passage and the second supply passage, and cooling the absorbent flowing in the first supply passage toward the absorber and heating the absorbent flowing in the second supply passage toward the regenerator,
   wherein the in-vehicle absorption pump device comprises an intermediate communication passage allowing a side of the liquid phase outlet port of the gas-liquid separator and a side of the inlet port of the absorber to communicate with each other so as to bypass the heat exchanger, an on-off valve capable of opening and closing the intermediate communication passage and closed in an ordinary mode, and a separator liquid level sensor for detecting a liquid level of the absorbent in the gas-liquid separator, and when the liquid level of the absorbent in the gas-liquid separator detected by the separator liquid level sensor is in or above a height range, the on-off valve is opened based on a signal of the separator liquid level sensor so that the absorbent in the gas-liquid separator is supplied to the absorber while bypassing the heat exchanger.

* * * * *